US008823978B2

(12) United States Patent
Kimura

(10) Patent No.: US 8,823,978 B2
(45) Date of Patent: Sep. 2, 2014

(54) DOCUMENT MANAGEMENT SYSTEM, DOCUMENT MANAGEMENT METHOD, AND STORAGE MEDIUM

(75) Inventor: Mitsuo Kimura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 666 days.

(21) Appl. No.: 12/942,844

(22) Filed: Nov. 9, 2010

(65) Prior Publication Data
US 2011/0134471 A1 Jun. 9, 2011

(30) Foreign Application Priority Data
Dec. 9, 2009 (JP) ................................. 2009-279720

(51) Int. Cl.
*G06F 3/12* (2006.01)
(52) U.S. Cl.
USPC ......... 358/1.15; 358/1.13; 358/1.1; 358/1.14; 709/201; 709/220
(58) Field of Classification Search
None
See application file for complete search history.

(56) References Cited

U.S. PATENT DOCUMENTS

| 6,856,414 B1* | 2/2005 | Haneda et al. | 358/1.15 |
| 7,209,251 B2* | 4/2007 | Hayashi | 358/1.15 |
| 7,239,406 B1* | 7/2007 | Piersol et al. | 358/1.15 |
| 2006/0044607 A1* | 3/2006 | Kato | 358/1.15 |

FOREIGN PATENT DOCUMENTS

JP 2002-312218 A 10/2002

* cited by examiner

*Primary Examiner* — Ashish K Thomas
(74) *Attorney, Agent, or Firm* — Canon USA Inc. IP Division

(57) ABSTRACT

A document management system includes a primary storage server and a secondary storage server. The primary storage server stores document information about a document including owner information for identifying a user having registered the document and group information for identifying a group to which the user belongs in the primary storage server storage device for each group based on the group information included in the document information. The secondary storage server specifies the group information for identifying the group to which the user accessing the document belongs, acquires the document information about the specified group information, and then stores the acquired document information in the secondary storage server storage device for each user based on the information about the user accessing the document.

10 Claims, 25 Drawing Sheets

FIG. 10B

| PRINT | CANCEL | | | | |
|---|---|---|---|---|---|
| | | | | | NEXT PAGE ▶ |
| DOCUMENT NAME | RECEPTION DATE AND TIME | NUMBER OF PAGES | NUMBER OF TIMES OF PRINTING | STATUS | OWNER NAME |
| ☐ DOCUMENT A | 2009/07/04 10:30:24 | 1 | 0 | PRINTING COMPLETED | Kimura |
| ☐ DOCUMENT B | 2009/07/04 10:30:24 | 3 | 0 | ERROR ENDS | Kimura |
| ☐ DOCUMENT C | 2009/07/04 10:30:24 | 2 | 0 | CANCEL ENDS | Takahashi |
| ☐ DOCUMENT D | 2009/07/04 10:30:24 | 2 | 0 | PRINTING | Tanaka |
| ☐ DOCUMENT E | 2009/07/04 10:30:24 | 3 | 0 | PRINTING | Takahashi |
| ☐ DOCUMENT F | 2009/07/04 10:30:24 | 1 | 0 | PRINT WAITING | Kimura |
| ☐ DOCUMENT G | 2009/07/04 10:30:24 | 1 | 0 | WAITING | Tanaka |
| ☐ DOCUMENT H | 2009/07/04 10:30:24 | 2 | 0 | WAITING | Kimura |

DOCUMENT MANAGEMENT SYSTEM, DOCUMENT MANAGEMENT METHOD, AND STORAGE MEDIUM

BACKGROUND OF THE INVENTION

1. Field of the Invention

The present invention relates to a document management system, a document management method, and a storage medium.

2. Description of the Related Art

Conventionally, a print document management system for managing print document data to be printed and a printer for performing printing have been known. The print document managing system receives print document data from user applications and another document managing system, generates information about the print document data (print document information), and stores the generated print document information associated with the print document data.

According to an acquisition request for a print document data list from a user, the print document managing system returns a print document information list and displays the list on a user's terminal. Further, according to the print execution request from the user, the print document managing system performs print processing, and reflects a process and a result thereof on information about the print document.

For the print document data (print document) managed by the print document managing system, an access right can be set. For an acquisition request for the print document data list from the user, the user who has performed the request can be identified and only permitted print document information is returned to the user. Further, for the print execution request from the user, according to the setting of the access right, the request is permitted or refused.

The print document managing system normally uses the database to manage the print document information, and then searches the database to generate the print document information list to be returned to the user. Since the print document information stored in the database reflects the process and the result of the print processing in real time, the print document information is frequently updated.

Therefore, under a circumstance where printing is continuously performed, performance for responding to the acquisition request for the print document data list from users may be extremely deteriorated. As a solution for such a problem, a method is used in which an update database and a reference database are prepared so that information included in the update database is reflected on the reference database according to a schedule.

Further, Japanese Patent Application Laid-Open No. 2002-312218 discusses a database system in which, between the update database and the reference database, a cache database is provided so that a change of the update database can be smoothly reflected on the reference database.

In recent years, due to popularity of the internet and a high speed of the network, functions of software have been increasingly provided as services on the internet. A case is conceivable where the print document managing system is present as a back end of the aforementioned service. In such a case, it is demanded that the print document managing system can manage a greater amount of the print document data than ever before.

On the other hand, in the database system described in Japanese Patent Application Laid-Open No. 2002-312218, according to an increasing amount of the data to be managed, the database becomes a bottle neck to deteriorate both of the update performance and the reference performance. Thus, each of the update database and the reference database needs to be divided into a plurality of databases to enable the data to be managed separately.

SUMMARY OF THE INVENTION

According to an aspect of the present invention, a document management system, in which a user is permitted to refer to a document whose owner having registered the document is a member of a group to which the user belongs, including a primary storage server and a secondary storage server, the document management system includes: a storage unit that is included in the primary storage server and configured to store document information about the document including owner information for identifying the user who has registered the document and group information for identifying a group to which the user belongs in a primary storage server storage device for each group based on the group information included in the document information; a specification unit that is included in the secondary storage server and configured to specify the group information for identifying the group to which the user who accesses the document belongs; an acquisition unit that is included in the secondary storage server and configured to acquire the document information about the group information specified by the specification unit by a primary storage server storage device; and a storage unit that is included in the secondary storage server and configured to store the document information acquired by the acquisition unit in a secondary storage server storage device for each user based on information about the user who accesses the document.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 7A illustrates an example of users and groups to which the users belong to.

FIG. 10B illustrates a print document data list screen.

DESCRIPTION OF THE EMBODIMENTS

Various exemplary embodiments, features, and aspects of the invention will be described in detail below with reference to the drawings.

Figure 1:
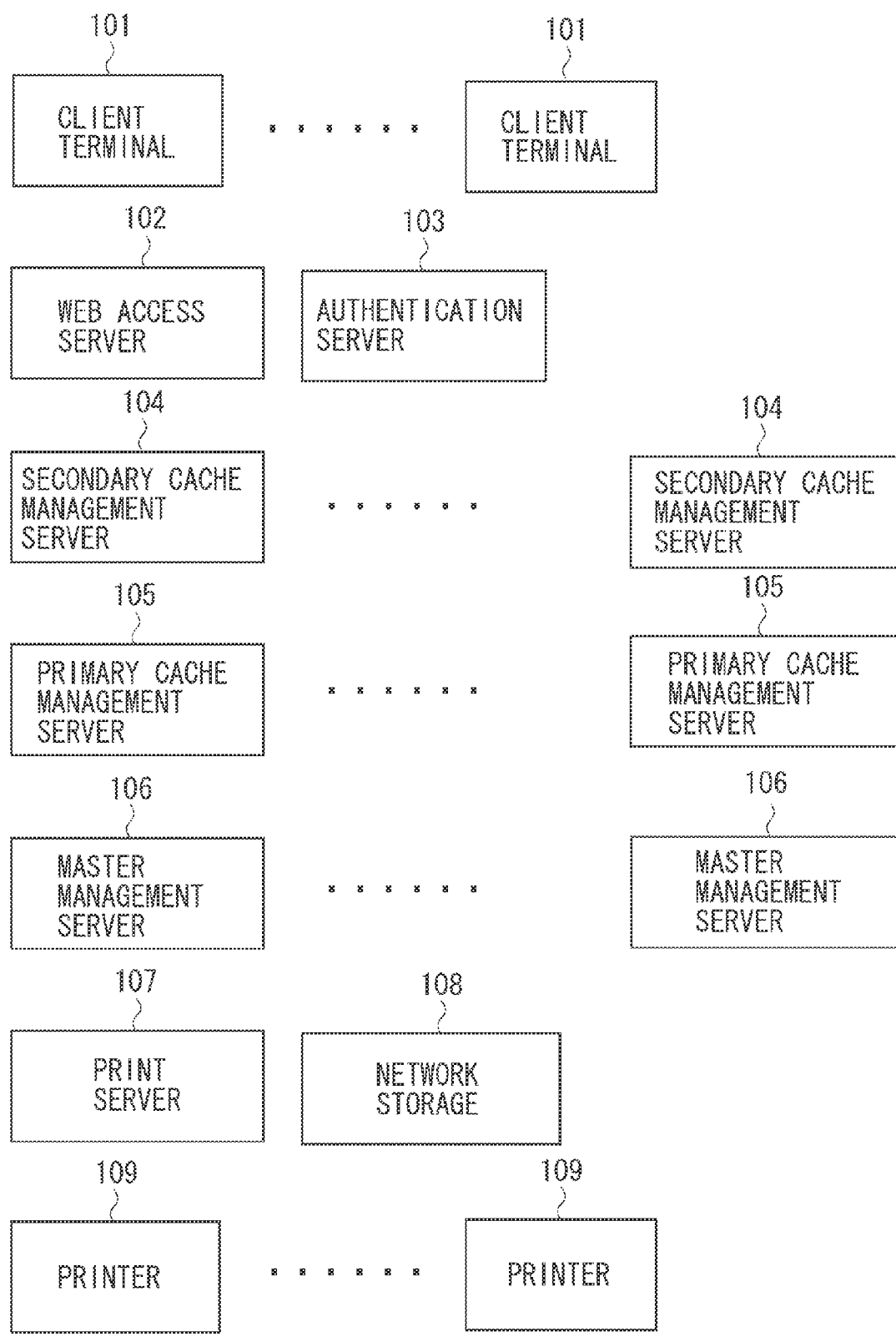
FIG. 1 is a block diagram illustrating a configuration of a print document managing system.

FIG. 1 illustrates a print document managing system according to the present exemplary embodiment.

The print document managing system includes a client terminal 101, a Web access server 102, an authentication server 103, a secondary cache management server 104, and a primary cache management server 105. Further, the print document managing system includes a master management server 106, a print server 107, a network storage 108, and a printer 109.

In FIG. 1, devices included in the aforementioned print document managing system are connected with each other via communication lines (not illustrated). According to the present exemplary embodiment, a plurality of client terminals 101, a plurality of secondary cache management servers 104, a plurality of primary cache management servers 105, a plurality of master management servers 106, and a plurality of printers 109 are connected with each other.

The Communication line is realized by any one of or a combination of, for example, a local area network (LAN), a wide area network (WAN), a telephone line, a dedicated digital line, an asynchronous transfer mode switching system (ATM) and a frame relay line, a cable television line, and a data broadcasting wireless line. The communication line refers to a communication network.

When the data can be transmitted/received, the method of the communication from the client terminal 101 to the Web access server 102, the method of the communication from the print server 107 to the network storage 108 or the printer 109, and the method of the communication between servers may be different.

The client terminal 101 may be, for example, a desk top personal computer (PC), a note PC, a mobile PC, a personal data assistant (PDA), and also may be a mobile phone in which an environment for performing a program is built. The authentication server 103 supports a protocol such as a lightweight directory access protocol (LDAP) and provides a directory service in order to manage information about the user in this system.

The print server 107 receives a print request, and then reads the print document data stored in the network storage 108, converts the print document data into a format that the printer 109 can interpret, and transmits the converted data to the printer 109. Further, the print server 107 monitors a print job of the printer 109, and traces the print job until the print is completed.

The network storage 108 is a storage that can be directory connected to a network such as a storage area network (SAN) or a network attached storage (NAS). The printer 109 is a printer such as a laser printer that can be connected to the network.

Figure 2:
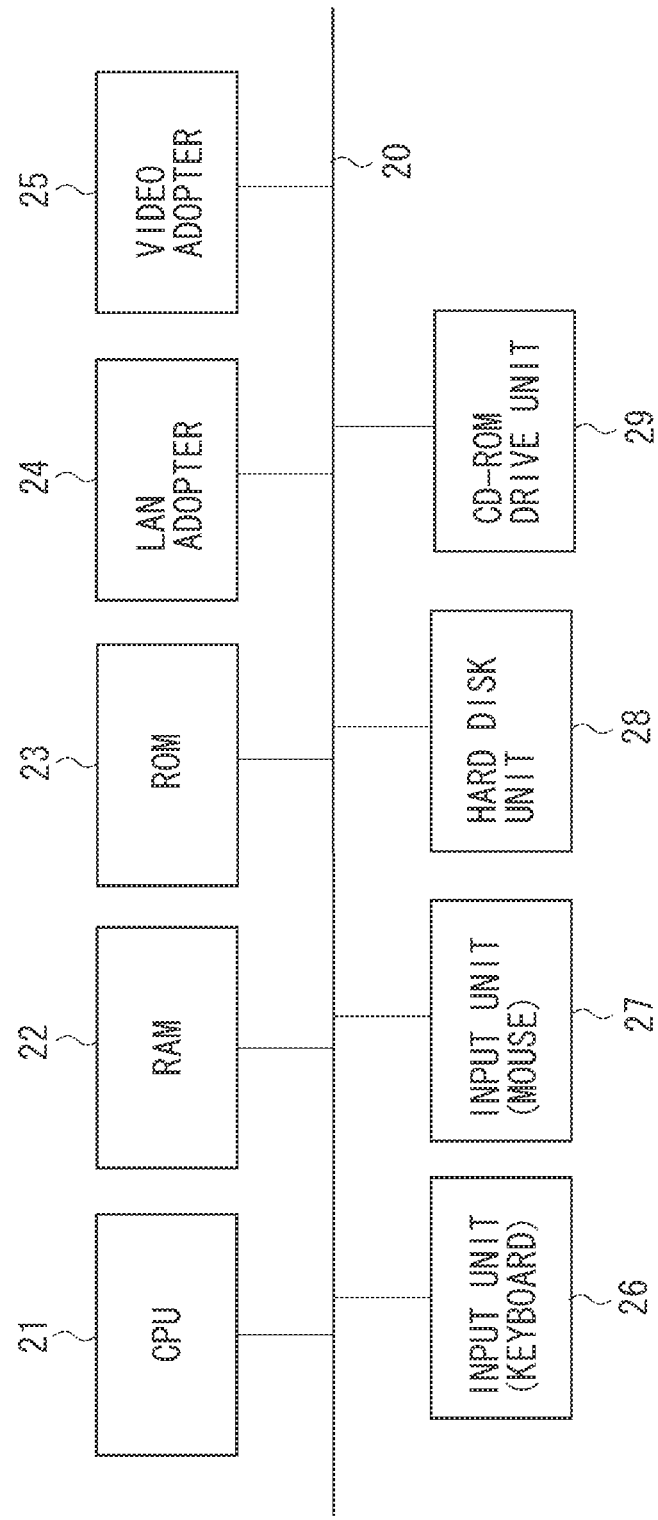
FIG. 2 is a block diagram illustrating a hardware configuration of each device in the print document managing system.

FIG. 2 illustrates an example of a hardware configuration of each device included in the print document managing system. The device may be one of the client terminal 101, the Web access server 102, the authentication server 103, the secondary cache management server 104, the primary cache management server 105, the master management server 106, the print server 107, and the network storage 108.

Each device includes a central processing unit (CPU) 21, a random access memory (RAM) 22, a read only memory (ROM) 23, a LAN adopter 24, a video adopter 25, an input unit (keyboard) 26, an input unit (mouse) 27, a hard disk unit 28, a compact disk ROM (CD-ROM) drive 29, and a system bus 20. The CPU 21, the RAM 22, the ROM 23, the LAN adopter 24, the video adopter 25, the input unit (keyboard) 26, the input unit (mouse) 27, the hard disk unit 28, and the CD-ROM drive unit 29 are connected with each other via a system bus 20.

The system bus 20 includes, for example, a peripheral component interconnect (PCI) bus, an accelerated graphic port (AGP) bus, and a memory bus. In FIG. 2, a connection chip and a keyboard interface for connecting the above-described devices to the system bus 20 and an input/output interface such as a small computer system interface (SCSI) and an at attachment packet interface (ATAPI) are not illustrated.

The CPU 21 controls the hardware and performs various types of operations such as four arithmetic operations and comparison operations based on a program of an operating system or an application program (program of the print document managing system). The RAM 22 stores the program of the operating system and the application program read from a storage medium such as a CD-ROM or a CD-recordable (CD-R) mounted in the hard disk unit 28 or the CD-ROM drive unit 29. These programs are executed by the CPU 21.

The ROM 23 stores a basic input/output system (BIOS) that cooperates with the operating system to control an input/output of data to/from the hard disk unit 28. The LAN adopter 24 cooperates with a communication program of the operating system controlled by the CPU 21 to communicate with an external device connected via the network. The video adopter 25 generates image signals to be output to a display device. The input unit (keyboard) 26 and the input unit (mouse) 27 are used to input instructions to each device.

The hard disk unit 28 stores the program of the operating system and the application program. The CD-ROM drive unit 29 is used when the storage medium such as the CD-ROM, the CD-R, and a CD-rewritable (CD-RW) is mounted therein to install the application program into the hard disk unit 28. In addition to or instead of the CD-ROM drive unit 29, a CD-R drive, a CD-RW drive, or a digital versatile disk (DVD) drive may be used.

According to the present exemplary embodiment, the CPU 21 performs processing according to a procedure of a program stored in the RAM 22 to realize functions of the devices and the processing of the flowchart described below.

FIGS. 3A, 3B, and 3C and FIGS. 4A, 4B, and 4C each illustrate an example of a software configuration of each device included in the print document managing system.

Figure 3A:
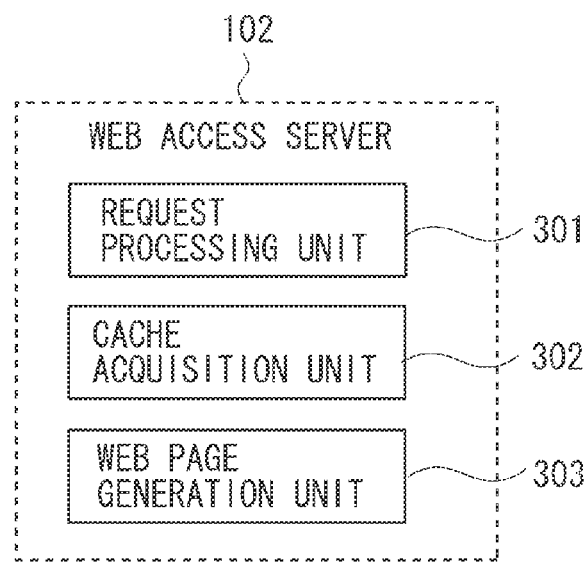
FIG. 3A is a block diagram illustrating a software configuration of a world wide web (Web) access server.

FIG. 3A illustrates the software configuration of the Web access server 102. The Web access server 102 is an example of an information providing server, which includes a request processing unit 301 that receives a request from the client terminal 101 and returns a response.

Further, the Web access server 102 includes a cache acquisition unit 302 that acquires the print document information cached from the primary cache management server 105 or the secondary cache management server 104. Details of the print document information will be described below (refer to FIG. 5B). Further, the Web access server 102 includes a web page generation unit 303 that generates from the acquired print document information a Web page to be returned to the client terminal 101.

Figure 3B:
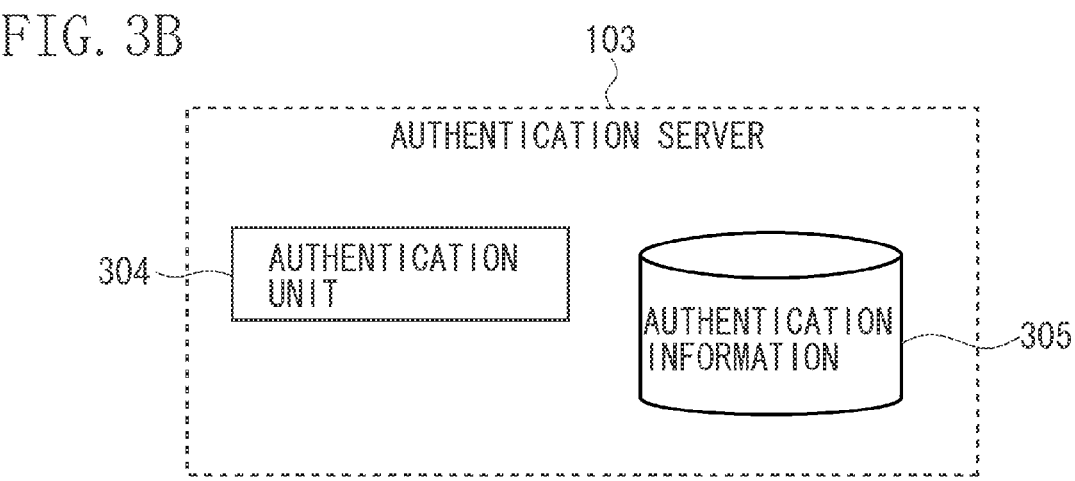
FIG. 3B is a block diagram illustrating a software configuration of an authentication server.

FIG. 3B illustrates a software configuration of the authentication server 103. The authentication server 103 includes an authentication unit 304 that receives a request from the Web access server 102, and then performs authentication of the user, and returns authentication information 305 to the Web access server 102.

Figure 3C:
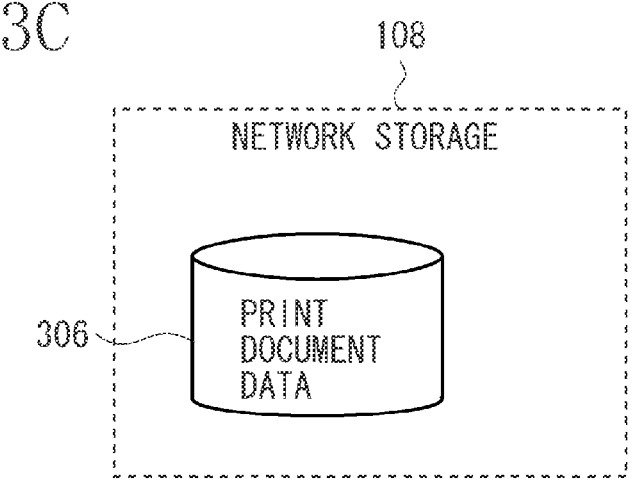
FIG. 3C is a block diagram illustrating a configuration of a network storage.

FIG. 3C illustrates a configuration of the network storage 108. The network storage 108 stores the print document data associated with the print document information.

Figure 4A:
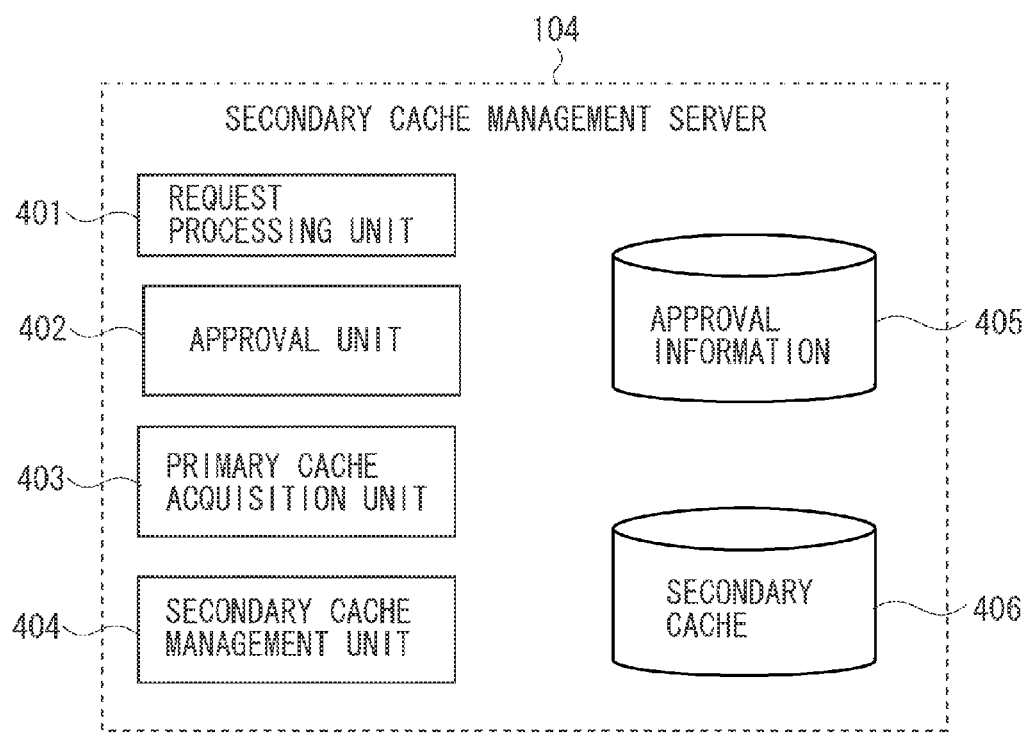
FIG. 4A is a block diagram illustrating a software configuration in a secondary cache management server.

FIG. 4A illustrates a software configuration of the secondary cache management server 104. The secondary cache management server 104 is an example of the secondary storage server, and includes a request processing unit 401 that receives a request from the Web access server 102 and then returns a response.

Further, the secondary cache management server 104 includes an approval information 405 including information for controlling an access right to the print document data. Furthermore, the secondary cache management server 104 includes an approval unit 402 for determining the print document data which the user of the authentication information 305 included in the request from the Web access server 102 is permitted to access.

Furthermore, the secondary cache management server 104 includes a primary cache acquisition unit 403 that acquires the cached print document information from the primary cache management server 105. Moreover, the secondary cache management server 104 includes a secondary cache 406 for each user that caches the accessible print document information and a secondary cache management unit 404 that manages the secondary cache 406. The secondary cache 406 is stored in, for example, the hard disk unit 28 that is an example of a storage device for a secondary storage server.

According to the present exemplary embodiment, the secondary caches 406 for respective users are separately managed by a plurality of secondary management servers 104. In other words, the secondary caches 406 for respective users can be separated for a plurality of secondary caches management servers 104.

Figure 4B:
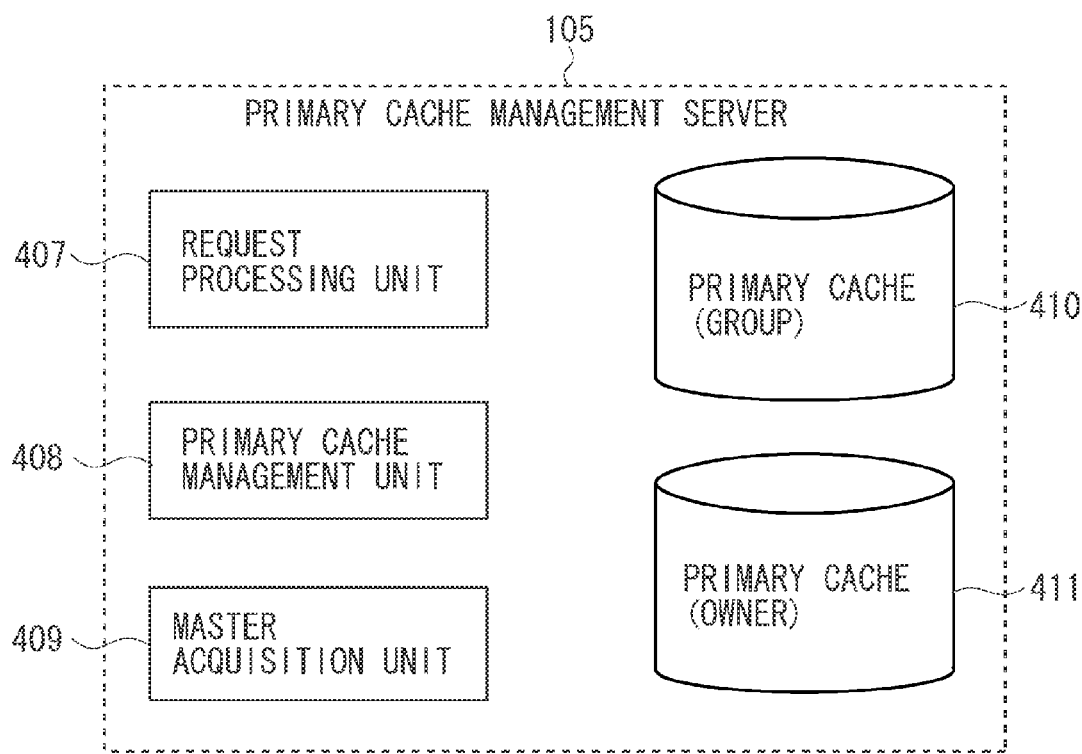
FIG. 4B is a block diagram illustrating a software configuration in a primary cache management server.

FIG. 4B illustrates a software configuration of the primary cache management server 105. The primary cache management server 105 is an example of the primary storage server, and includes a request processing unit 407 that receives a request from the Web access server 102 or the secondary cache management server 104, and then returns a response. The request processing unit 407 also receives a request from the master management server 106.

Further, the primary cache management server 105 includes a master acquisition unit 409 that acquires print document information of the master from the master management server 106. Furthermore, the primary cache management server 105 includes a primary cache (owner) 411 that caches the print document information for each owner (user who has registered the print document data) and a primary cache (group) 410 that caches the print document information for each group. A group refers to a group to which a user belongs to, and one group includes one or a plurality of users as a member.

Further, the primary cache management server 105 includes a primary cache management unit 408 that manages the primary cache (group) 410 and the primary cache (owner) 411. The primary cache (group) 410 and the primary cache (owner) 411 are stored in, for example, the hard disk unit 28 that is an example of the primary storage server storage device.

According to the preset exemplary embodiment, the primary caches (group) 410 and the primary caches (owner) 411 are separately managed by a plurality of primary cache management servers 105. In other words, the primary caches (group) 410 for respective groups can be separated for a plurality of primary cache management servers 105, and also the primary caches (owner) 411 for respective owners can be separated for a plurality of primary cache management servers 105.

Figure 4C:
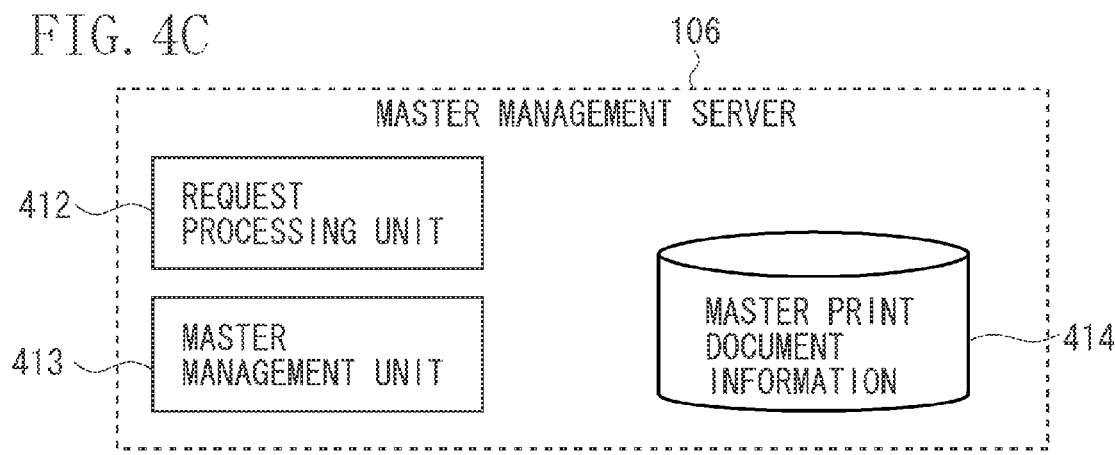
FIG. 4C is a block diagram illustrating a software configuration in a master management server.

FIG. 4C illustrates a software configuration of the master management server 106. The master management server 106 is an example of a master server, and includes a request processing unit 412 that receives a request from the primary cache management server 105 and then returns a response. The request processing unit 412 also receives a request from the print server 107.

Further, the master management server 106 includes master print document information 414 for each owner and a master management unit 413 that manages the master print document information 414. The master print document information 414 is stored in, for example, the hard disk unit 28 that is an example of the master server storage device. According to the present exemplary embodiment, the master print document information 414 for respective owners is separately managed by a plurality of master management servers 106. In other words, the master print document information 414 for respective owners can be separated for a plurality of master management servers 106.

Figure 5A:
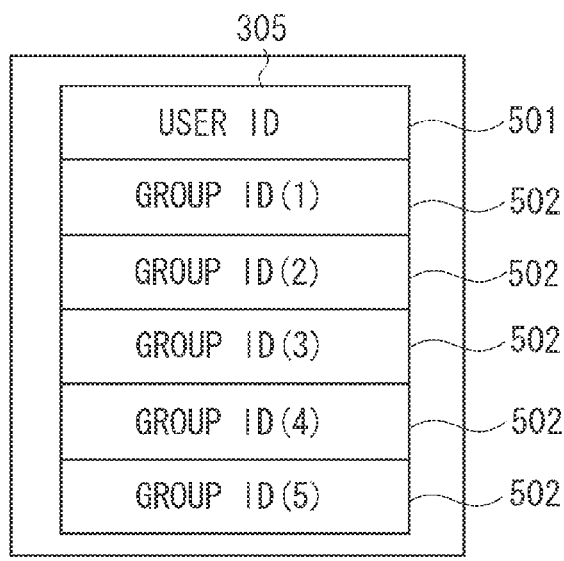
FIG. 5A illustrates a data structure of authentication information.

FIG. 5A illustrates an example of the authentication information 305 stored in the authentication server 103. The authentication information 305 includes a user identification (ID) 501 for identifying the user and a group ID 502 for identifying a plurality of groups to which the user belongs. According to the present exemplary embodiment, for convenience, the user can belong to maximum five groups.

Figure 5B:
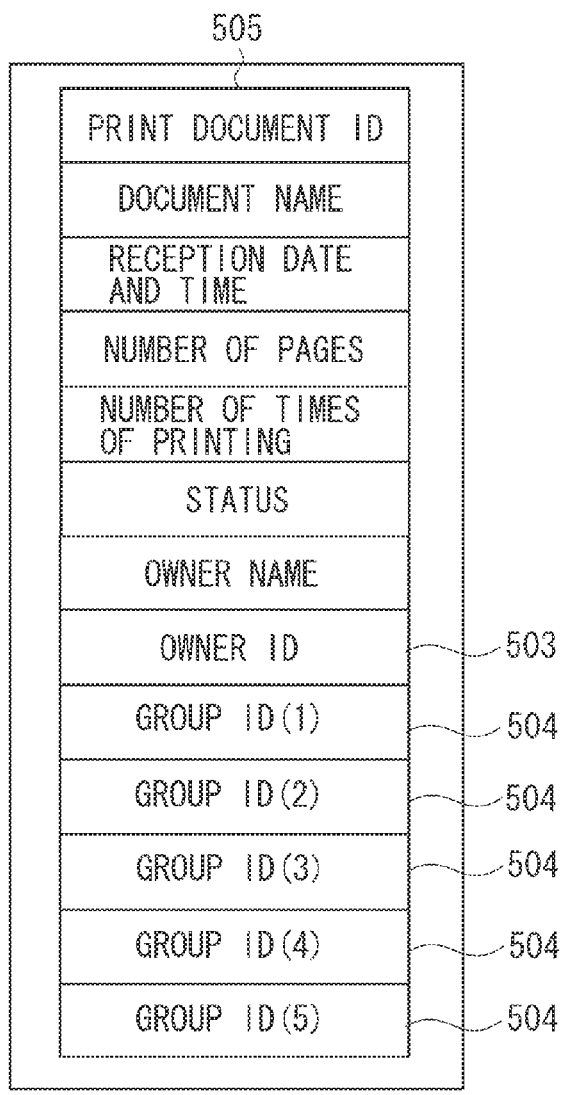
FIG. 5B illustrates a data structure of print document information.

FIG. 5B illustrates an example of print document information 505 included in the secondary caches 406, the primary cache (group) 410, the primary cache (owner) 411, and the master print document information 414. Print document information 505 includes a print document ID for identifying the print document data, a document name, the number of pages, a reception date and time indicating a date and time when the print document data is registered, and the number of times of printing that is updated every time printing is performed.

Further, the print document information 505 includes a status on which a proceeding status of the print processing is reflected when printing is performed. When printing is performed, the status changes from "WAITING" to "WAITING PRINTING" to "PRINTING". According to a result of the print processing, one of "PRINT COMPLETED", "ERROR ENDS", and "CANCEL ENDS" is finally set.

The print document information 505 stores the user ID 501 included in the authentication information 305 about the user who has registered the print document data as an owner ID 503 (example of owner information). Further, the print document information 505 stores group ID 502 included in the authentication information 305 about the user who has registered the print document data as a group ID 504 (example of group information).

Figure 6:
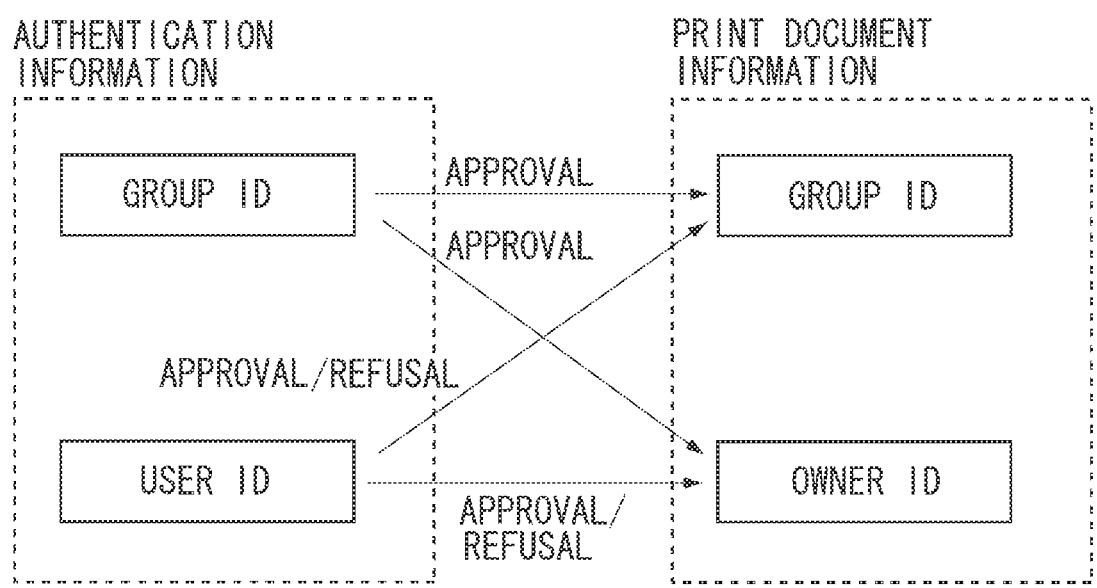
FIG. 6 illustrates an access right to print document data that can be set.

FIG. 6 illustrates an example of the access right to print document data that can be set by the approval information 405 stored by the secondary cache management server 104. As the access right to the print document data, a permission (or refusal) for accessing the owner ID 503 stored in the print document information can be set for the user ID 501 or the group ID 502 included in authentication information 305. A permission (or refusal) for accessing the group ID 504 stored in the print document information can be also set for the user ID 501 or the group ID 502 included in the authentication information 305.

Figure 7A:
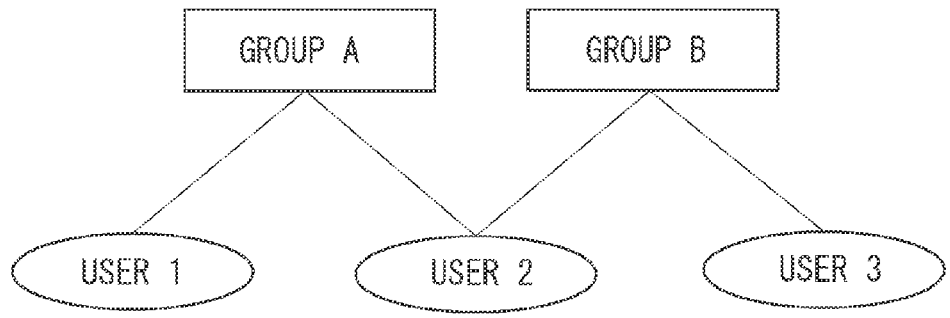

FIG. 7A illustrates that a user 1 and a user 2 belong to a group "A", and the user 2 and a user 3 belong to a group "B".

Figure 7B:
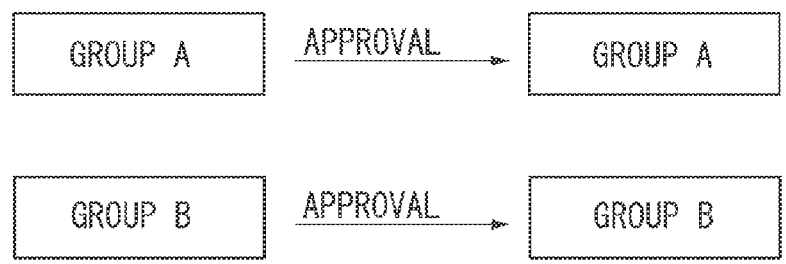
FIG. 7B illustrates an example of access rights to the print document data.

FIG. 7B illustrates that, by the approval information 405, the user belonging to the group "A" is permitted to access the print document data which the user belonging to the group "A" has registered. Further, FIG. 7B illustrates that, by the approval information 405, the user belonging to the group "B" is permitted to access the print document data which the user belonging to the group "B" has registered.

Figure 7C:
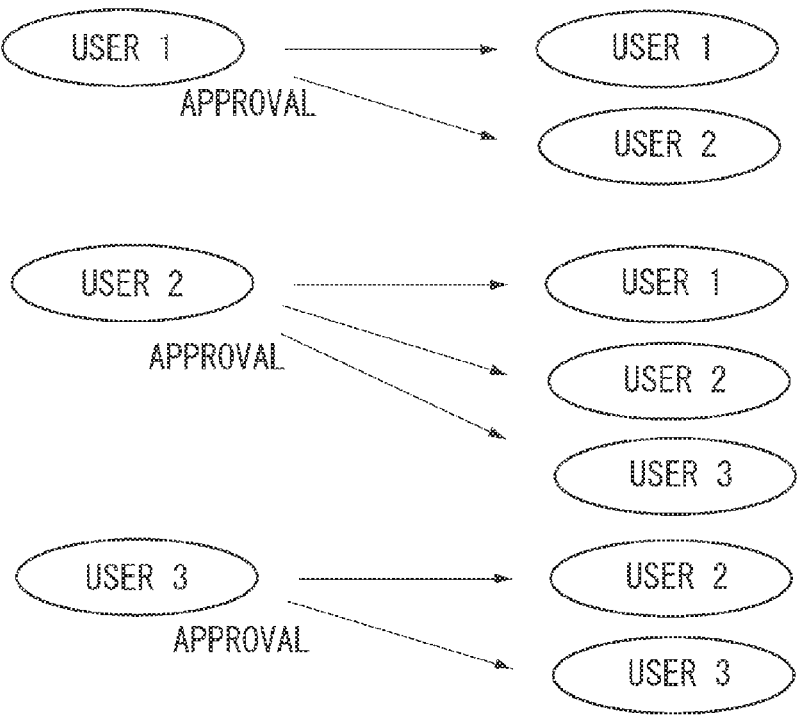
FIG. 7C illustrates an example of the print document data to which the users are permitted to refer.

FIG. 7C illustrates the print document data to which the user is permitted to refer, as a result of setting the access right illustrated in FIG. 7B for the user illustrated in FIG. 7A. The user 1 belonging to the group "A" can access the print document data which the user 1 or the user 2 belonging to the group "A" has registered.

The user 2 belonging to the group "A" and the group "B" can access the print document data which anyone of the user 1, the user 2, and the user 3 belonging to the group "A" or the group "B" has registered. The user 3 belonging to the group "B" can access the print document data which the user 2 or the user 3 belonging to the group "B" has registered.

Figure 8A:
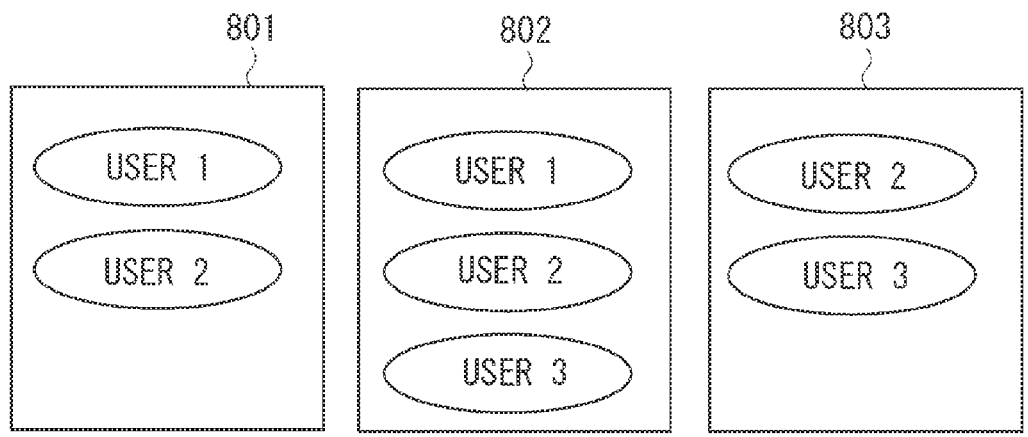
FIG. 8A illustrates an example of the print document information in the secondary cache management server.
Figure 8B:
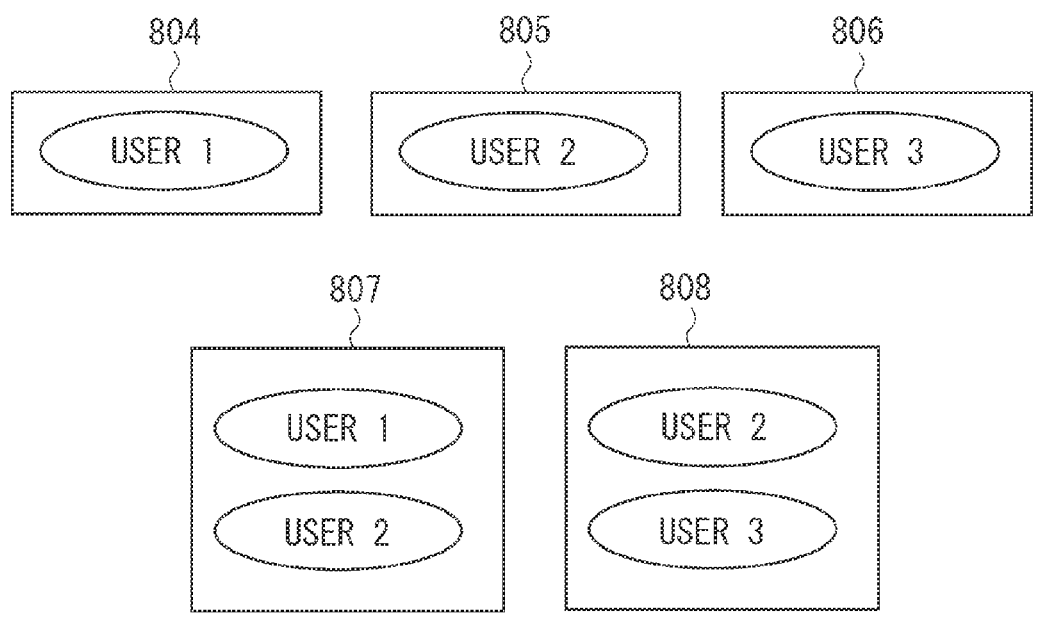
FIG. 8B illustrates an example of the print document information in the primary cache management server.
Figure 8C:
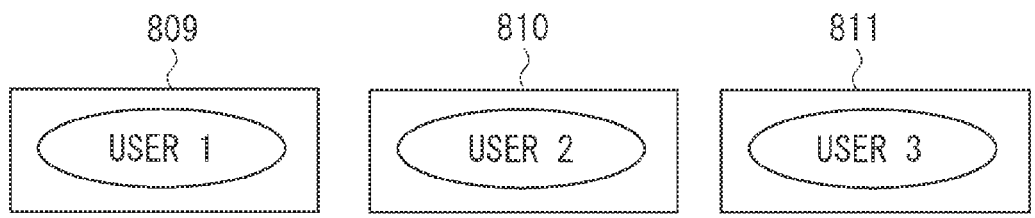
FIG. 8C illustrates an example of the print document information in the master management server.

FIGS. 8A, 8B, and 8C illustrate examples of the print document information managed by the secondary cache management server 104, the primary cache management server 105, and the master management server 106.

FIG. 8A illustrates an example of a configuration of the secondary cache 406 managed by the secondary cache management server 104. The secondary cache 406 managed for each user includes a print document list 801 which the user 1 can access, a print document list 802 which the user 2 can access, and a print document list 803 which the user 3 can access.

The print document list 801 includes the print document information 505 which the user 1 can access and whose owner is the user 1, and the print document information 505 whose owner is the user 2. The print document list 802 includes the print document information 505 which the user 2 can access and whose owner is the user 1, the print document information 505 whose owner is the user 2, and the print document information 505 whose owner is the user 3.

Further, the print document list 803 includes the print document information 505 which the user 3 can access and whose owner is the user 2, and the print document information 505 whose owner is the user 3. The secondary caches 406 are separated for respective users, thus, the secondary cache 406 can be separately managed for respective users by a plurality of secondary cache management servers 104.

FIG. 8B illustrates an example of configurations of the primary cache (group) 410 and the primary cache (owner) 411 managed by the primary cache management server 105. The primary cache (owner) 411 managed for each owner includes a print document information list 804 whose owner is the user 1, a print document information list 805 whose owner is the user 2, and a print document information list 806 whose owner is the user 3.

The print document information list 804 includes the print document information 505 whose owner is the user 1. The print document information list 805 includes the print document information 505 whose owner is the user 2. The print document information list 806 includes the print document information 505 whose owner is the user 3.

The primary cache (group) 410 managed for each group includes a print document information list 807 whose owner is a user belonging to the group "A" and a print document information list 808 whose owner is a user belonging to the group "B". A print document information list 807 includes the print document information 505 whose owner is the user 1 belonging to the group "A" and the print document information 505 whose owner is the user 2.

The print document information list 808 includes the print document information 505 whose owner is the user 2 belonging to the group "B" and the print document information 505 whose owner is the user 3.

Since the primary cache (owner) 411 is constructed for respective owners, the primary caches (owner) 411 can be managed separately for respective owners by a plurality of primary cache management servers 105. Further, since the primary cache (group) 410 is constructed for respective groups, the primary caches (group) 410 can be managed separately for respective groups by a plurality of primary cache management servers 105.

FIG. 8C illustrates an example of a configuration of the master print document information 414 managed by the master management server 106. The master print document information 414 managed for each owner includes a print document information list 809 whose owner is the user 1, a print document information list 810 whose owner is the user 2, and a print document information list 811 whose owner is the user 3.

The print document information list 809 includes the print document information 505 whose owner is the user 1. The print document information list 810 includes the print document information 505 whose owner is the user 2. The print document information list 811 includes the print document information 505 whose owner is the user 3. Since the master print document information 414 is constructed for each owner, the master print document information 414 can be managed separately for respective owners by a plurality of primary cache management servers 106.

Figure 9:
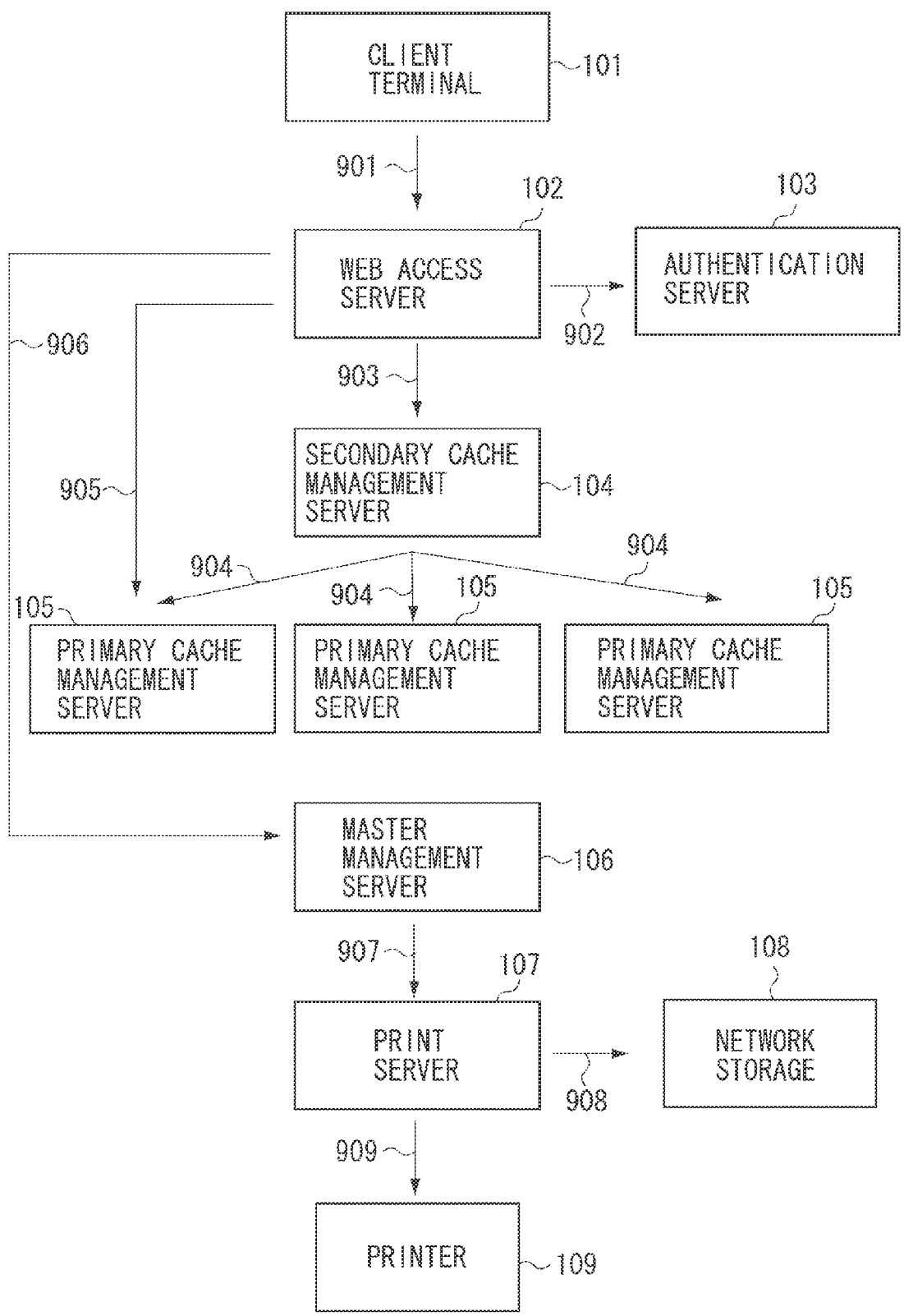
FIG. 9 illustrates an example of processing performed by the print document managing system.

FIG. 9 illustrates an example of processing performed since the user has performed input via the client terminal 101 until a list of the print document data which the user is permitted to access is displayed, and an example of processing performed since the user has specified print data until the printer 109 performs printing.

Figure 10A:
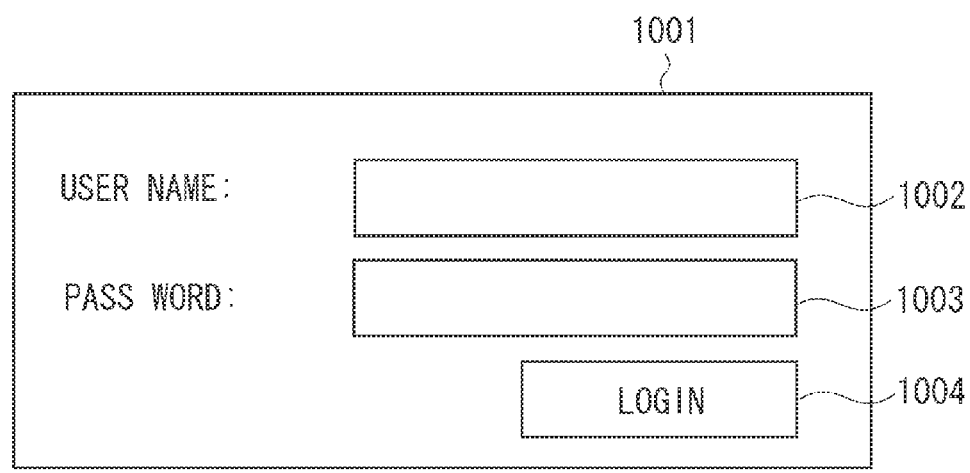
FIG. 10A illustrates a login screen.

FIGS. 10A and 10B illustrate examples of screens displayed on the client terminal 101. First, with reference to FIGS. 9, 10A, and 10B, an example where a list of the print document data is displayed will be described.

If the user inputs the user name and the password via the input unit (keyboard) 26 on a login screen (illustrated in FIG. 10A) displayed on the client terminal 101, the client terminal 101 transmits a login request 901 to the Web access server 102. The login request 901 includes the user name and the password input by the user.

The Web access server 102 that has received the login request 901 transmits an authentication request 902 to the authentication server 103. The authentication request 902 includes the user name and the password input by the user. The authentication server 103 that has received the authentication request 902 performs authentication processing, and then returns the authentication information 305 to the Web access server 102.

The Web access server 102 that has received the authentication information 305 from the authentication server 103 transmits a secondary cache acquisition request 903 to the secondary cache management server 104. The secondary cache acquisition request 903 includes the authentication information 305 acquired from the authentication server 103.

The secondary cache management server 104 that has received the secondary cache acquisition request 903 transmits the primary cache difference acquisition request 904 to one or more primary cache management servers 105. The primary cache difference acquisition request 904 includes the target owner ID and the target group ID for acquiring the primary cache (group) 410 and the primary cache (owner) 411.

The primary cache management server 105 that has received the primary cache difference acquisition request 904 returns the primary cache (group) 410 and the primary cache (owner) 411 to the secondary cache management server 104. The secondary cache management server 104 reflects the acquired primary cache to the secondary cache 406, and then returns the secondary cache 406 to the Web access server 102.

The Web access server 102 generates the Web page from the secondary cache 406 and returns the generated Web page to the client terminal 101. A list screen of the print document data, illustrated in FIG. 10B, that the user can access is displayed on the client terminal 101.

If the print document data that the user can access is the print document data for a single owner or a single group, the Web access server 102 transmits a primary cache acquisition request 905 to the primary cache management server 105.

In other words, the Web access server 102 does not acquire the secondary cache 406 from the secondary cache management server 104 but acquires the primary cache (group) 410 or the primary cache (owner) 411 from the primary cache management server 105. More specifically, the primary cache management server 105 that has received the primary cache acquisition request 905 returns the primary cache (group) 410 or the primary cache (owner) 411 to the Web access server 102.

The Web access server 102 generates the Web page from the primary cache (group) 410 or the primary cache (owner) 411, and then returns the generated Web page to the client terminal 101. A case where the secondary cache 406 is not acquired from the secondary cache management server 104 will be described in detail below.

FIG. 10A illustrates an example of a login screen 1001 displayed on the client terminal 101. The user inputs the user name and the password into a user name input unit 1002 and a password input unit 1003 respectively via the input unit (keyboard) 26. When the user clicks a login button 1004, the client terminal 101 transmits the login request 901 including the user name and the password input into the Web access server 102.

FIG. 10B illustrates an example of the print document data list screen 1005 displayed on the client terminal 101.

The user selects the print document data which the user desires to print in a print document data list 1009 and clicks a print button 1006 to instruct execution of printing via the input unit (keyboard) 26. Alternatively, the user clicks a print cancel button 1007 to instruct stop of printing. When the user clicks a page switch button 1008, the client terminal 101 switches the current page displayed on a print document data list 1009 to the next page.

Figure 11:
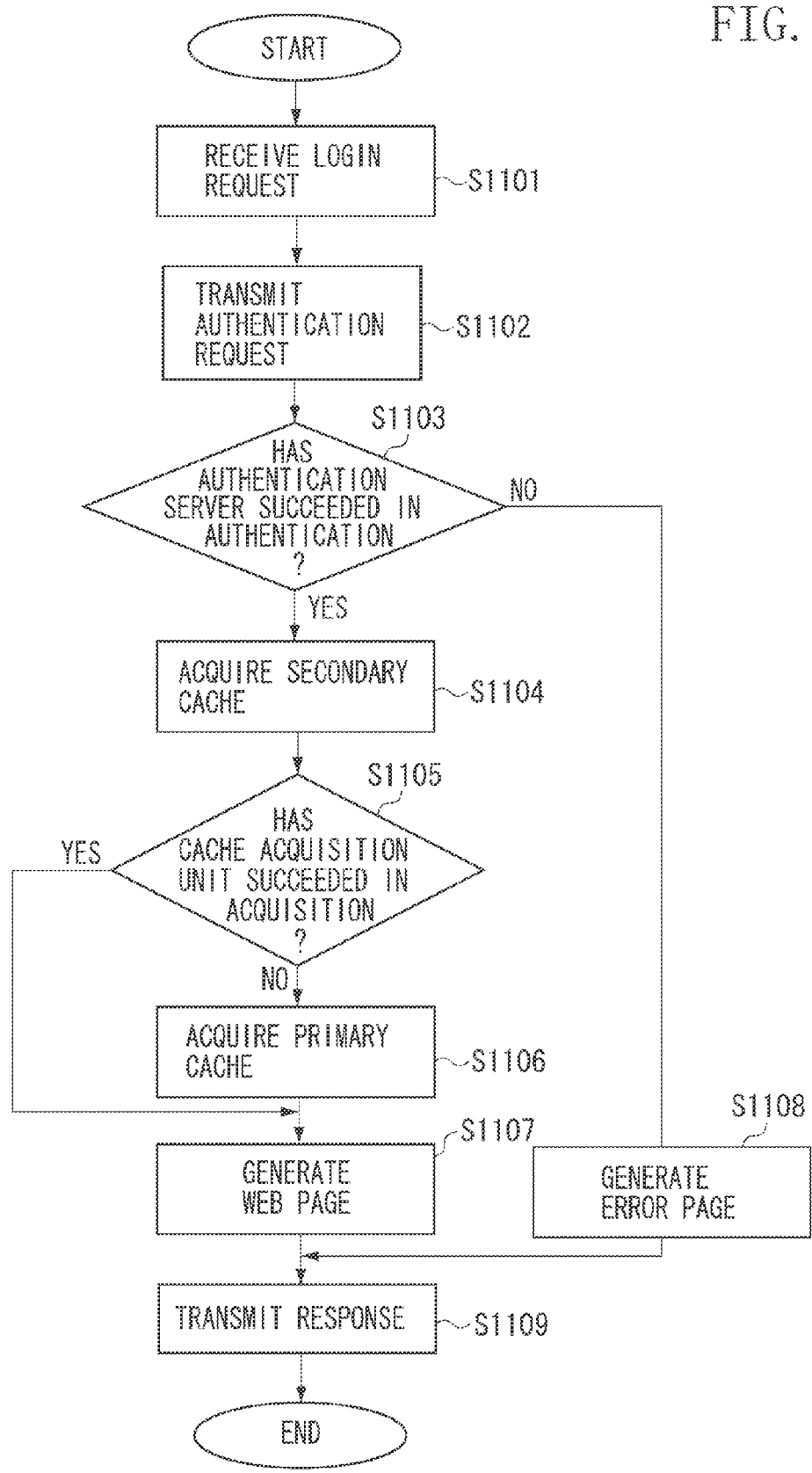
FIG. 11 is a flowchart illustrating processing performed by the Web access server.

FIG. 11 is a flowchart illustrating an example of processing performed by the Web access server 102 that has received the login request 901 from the client terminal 101 in the processing illustrated in FIG. 9. The program according to this processing, which is stored in the hard disk unit 28 of the Web access server 102, is read by the CPU 21 into the RAM 22 and then executed.

In FIG. 11, in step S1101, the request processing unit 301 receives the login request 901, and, in step S1102, transmits the authentication request 902 to the authentication server 103. The authentication request 902 includes the user name and password, which are examples of user information that has been received together with the login request 901 from the client terminal 101. According to the present exemplary embodiment, as information for authenticating the user, the user name and the password are used, however, the information is not limited thereto.

Subsequently, in step S1103, the request processing unit 301 determines whether the authentication server 103 has succeeded in the user authentication. When the request processing unit 301 determines that the authentication server 103 has succeeded therein (YES in step S1103), the processing proceeds to step S1104. On the other hand, when the request processing unit 301 determines that the authentication server 103 has failed therein (NO in step S1103), the processing proceeds to step S1108.

For example, when the request processing unit 301 receives a response (e.g., authentication information 305 including the user ID) that the authentication server 103 has succeeded in the user authentication therefrom, the request processing unit 301 determines that the authentication server 103 has succeeded in the user authentication. On the other hand, when the request processing unit 301 receives a response (e.g., authentication information 305 including no data such as the user ID) that the authentication server 103 has failed in the user authentication therefrom, the request processing unit 301 determines that the authentication server 103 has failed in the user authentication.

In step S1104, the cache acquisition unit 302 specifies the secondary cache management server 104 that manages the secondary cache 406 to which a login user is permitted to refer, and transmits the secondary cache acquisition request 903 thereto.

As a method for specifying the secondary cache management server 104 that manages the secondary cache 406 to which the login user is permitted to refer, a known method is adopted. For example, a list is prepared that associates the user ID with the secondary cache management server 104 (internet protocol (IP) address) that manages the secondary cache 406 relating to the user ID. The cache acquisition unit 302 specifies the secondary cache management server 104 using the user ID of the login user as a key with reference to the list.

In step S1105, the cache acquisition unit 302 determines whether the secondary cache management server 104 has succeeded in acquiring the secondary cache 406. When the cache acquisition unit 302 determines that the secondary cache management server 104 has succeeded therein (YES in step S1105), the processing proceeds to step S1107. On the other hand, when the cache acquisition unit 302 determines that the secondary cache management server 104 has failed therein (NO in step S1105), the processing proceeds to step S1106.

When an error has been received from the secondary cache management server 104 as described in step S2101 below, the cache acquisition unit 302 determines that the secondary cache management server 104 has failed (NO in step S1105).

In step S1106, the cache acquisition unit 302 transmits the primary cache acquisition request 905 to the primary cache management server 105 that manages the primary cache (group) 410 to which the login user is permitted to refer. The cache acquisition unit 302 acquires the primary cache (group) 410. Alternatively, the cache acquisition unit 302 transmits the primary cache acquisition request 905 to the primary cache management server 105 that manages the primary cache (owner) 411 to acquire the primary cache (owner) 411.

As a method for specifying the primary cache management server 105 that manages the primary cache (group) 410 to which the login user is permitted to refer, a method heretofore known is adopted. Further, as a method for specifying the primary cache management server 105 that manages the primary cache (owner) 411 to which the login user is permitted to refer, a known method is adopted.

In step S1107, the web page generation unit 303 generates the Web page from the secondary cache 406 acquired from the secondary cache management server 104. Alternatively, the web page generation unit 303 generates the Web page from the primary cache (group) 410 or the primary cache (owner) 411 acquired from the primary cache management server 105.

In step S1108, the web page generation unit 303 generates an error page (Web page). In step S1109, the request processing unit 301 transmits the Web page generated in step S1107 or step S1108 to the client terminal 101.

As described above, FIG. 9 also illustrates an example of processing to be performed when the user performs input via the client terminal 101 to execute printing. When the user selects the print document data on the print document data list screen 1005 illustrated in FIG. 10A, and clicks the print button 1006 to execute printing, the Web access server 102 transmits a print request 906 to the master management server 106. The print request 906 includes a print document ID for specifying the print document data and a printer name that executes printing.

The master management server 106 that has received the print request 906 transmits a print request 907 to the print server 107. The print request 907 includes information indicating a storage location of the print document data and the printer name. The print server 107 that has received the print request 907 acquires the print document data from the network storage 108, converts the acquired print document data so that the printer 109 can interpret the print document data, and then transmits the converted data to the printer 109.

Figure 12:
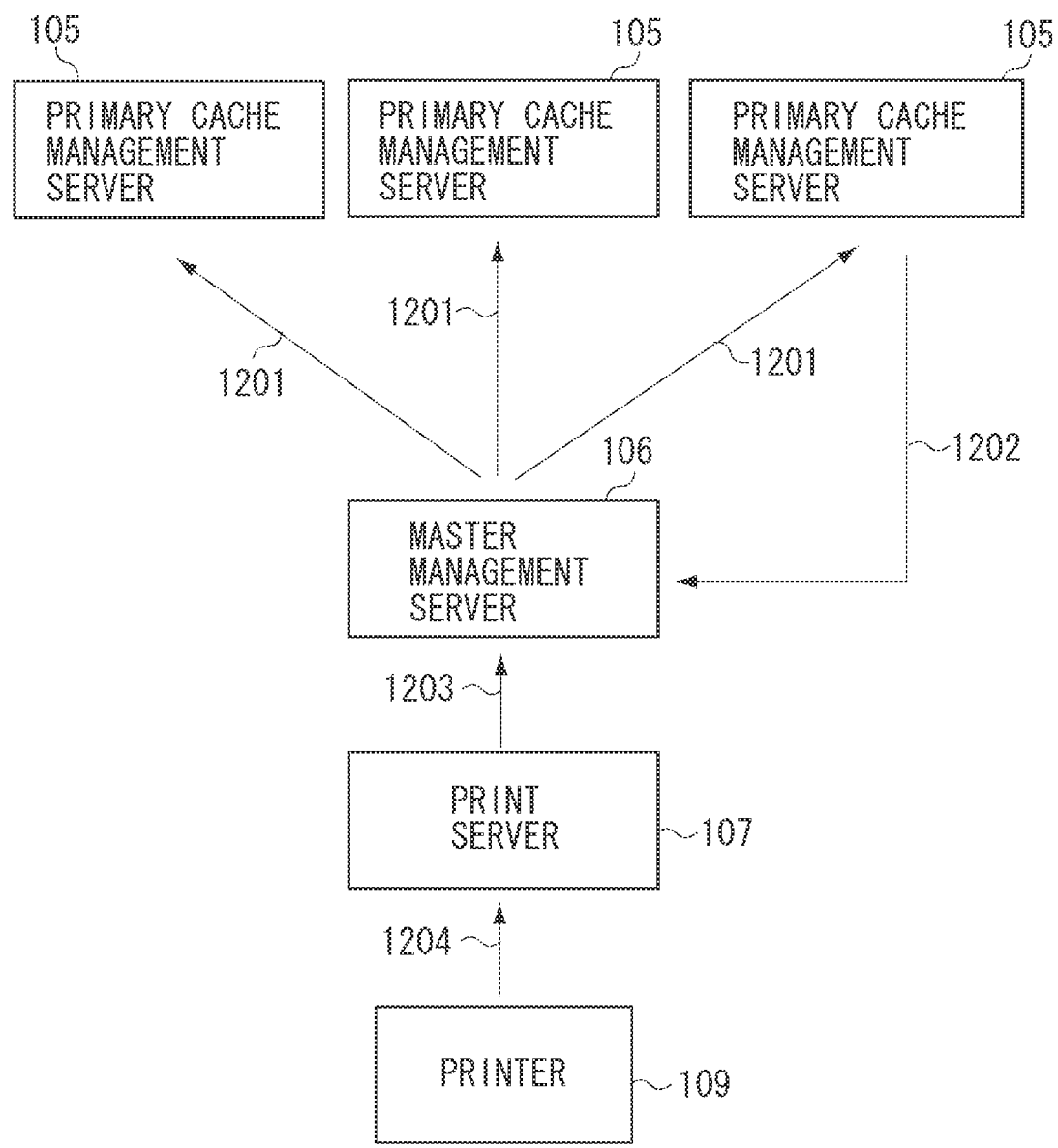
FIG. 12 illustrates an example of processing performed by the print document managing system.

FIG. 12 illustrates an example of processing to be performed when the printer 109 informs the print server 107 that monitors the print job being operated by the printer 109 that a state of a print job has been changed.

The print server 107 that has received a print job state change notification 1204 from the printer 109 transmits an update request 1203 to the master management server 106. The update request 1203 includes an ID for identifying the print document data.

The master management server 106 that has received the update request 1203 updates the master print document information 414. The master management server 106 transmits the update request 1201 to all primary cache management servers 105 that manage the primary cache (owner) 411 relating to the owner ID included in the updated master print document information 414.

Further, the master management server 106 transmits the update request 1201 to all primary cache management servers 105 that manage the primary cache (group) 410 relating to the group ID included in the updated master print document information 414. The updated update request 1201 includes the updated print document information 505 and the owner ID or the group ID of an update destination.

As a method for specifying all the primary cache management servers 105 that manage the primary cache (owner) 411 relating to the owner ID included in the updated master print document information 414, a known method is adopted. Further, as a method for specifying all the primary cache management servers 105 that manage the primary cache (group) 410 relating to the group ID included in the updated master print document information 414, a known method is adopted.

The primary cache management server 105 that has received the update request 1201 updates the primary cache (owner) 411 relating to the owner ID of the update destination and the primary cache (group) 410 relating to the group ID of the update destination. At this point, if the primary cache management server 105 that has received the update request 1201 detects a missing of the update request 1201, a difference acquisition request 1202 of the master print document information 414 is transmitted to the master management server 106.

The difference acquisition request 1202 includes an updated version (version information) of the print document information 505 included in the update request 1201 that the primary cache management server 105 has received last. The master management server 106 that has received the difference acquisition request 1202 returns the master print document information 414 (e.g., print document information 505) that is newer than the updated version as a difference.

Figure 13:
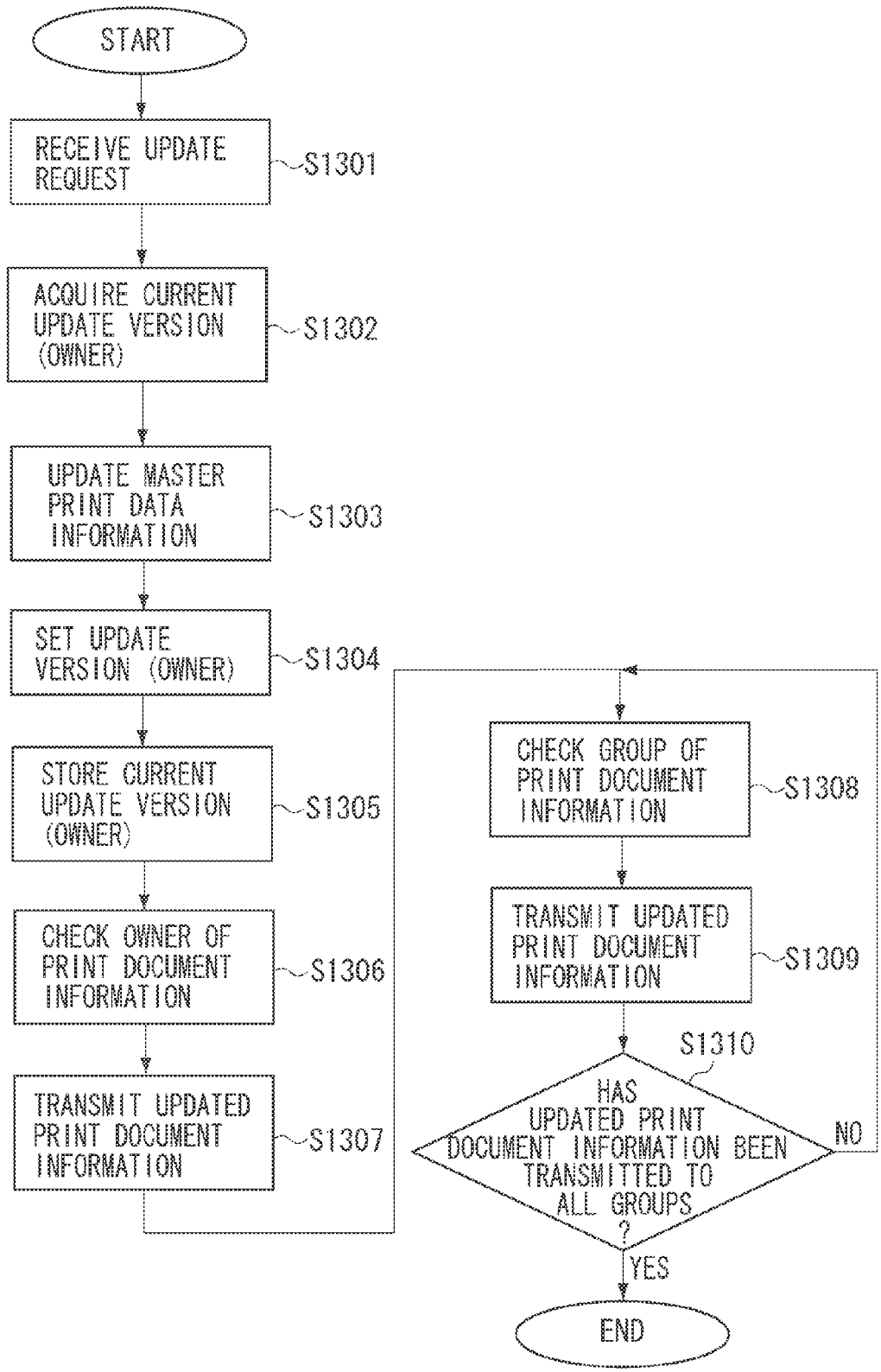
FIG. 13 is a flowchart illustrating processing performed by the master management server.

FIG. 13 is a flowchart illustrating processing performed by the master management server 106 that has received the update request 1203 in the example of the processing illustrated in FIG. 12. The program according to this flowchart, which is stored in the hard disk unit 28 of the master management server 106, is read by the CPU 21 into the RAM 22 to be executed.

First, in step S1301, the request processing unit 412 of the master management server 106 receives the update request 1203. Next, in step S1302, the master management unit 413 acquires a current update version (owner) 1403 of the master print document information 414 that is the update destination.

Figure 14:
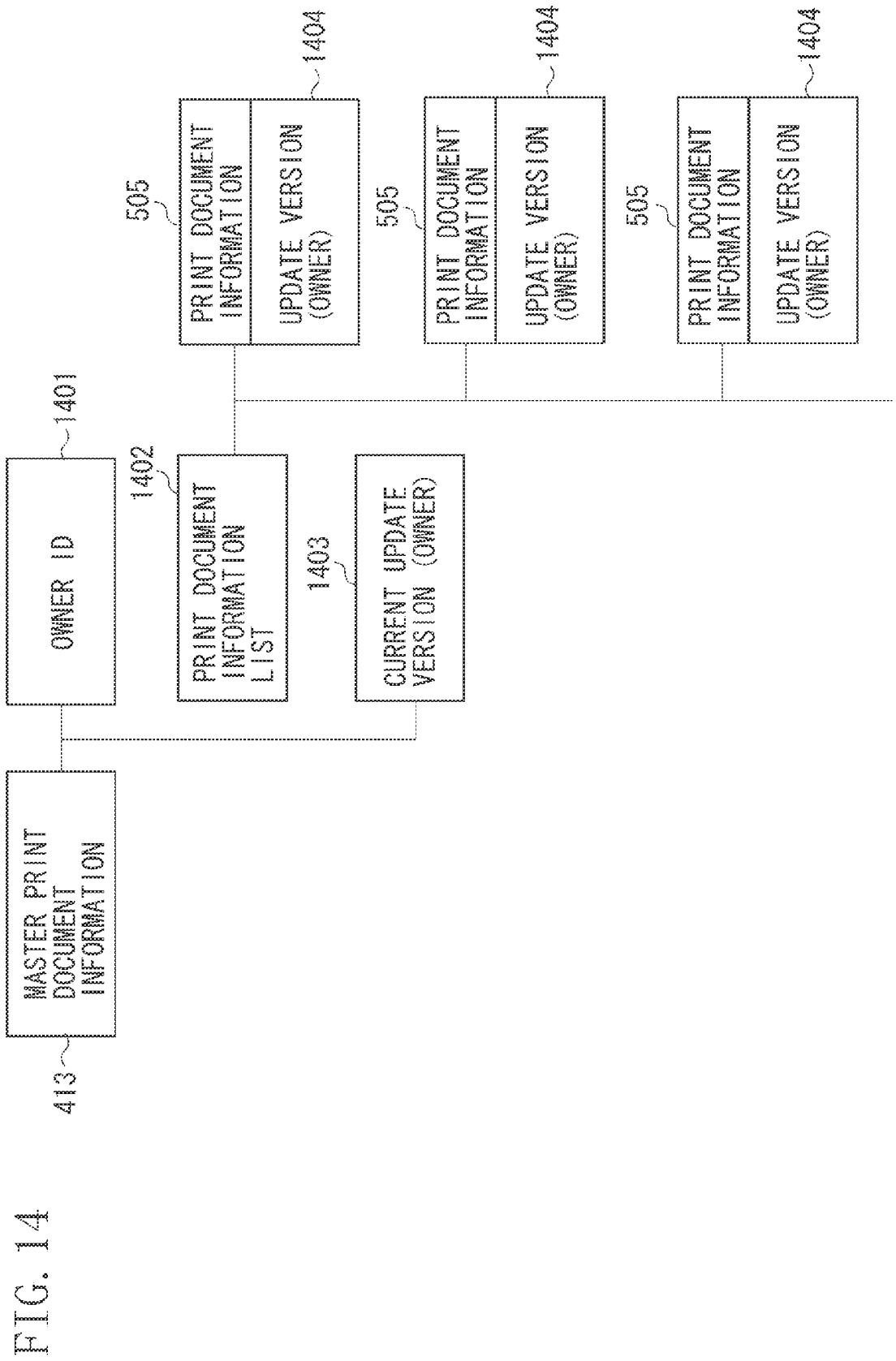
FIG. 14 illustrates a data structure of master print document information.

FIG. 14 illustrates an example of a data structure of the master print document information 414 managed by the master management server 106. The master print document information 414 includes an owner ID 1401 and a print document information list 1402. The same number of pieces of master print document information 414 as that of the owners are present, and separately managed by a plurality of master management server 106.

In step S1303, the master management unit 413 updates the print document information 505 of the print document ID included in the update request 1203. In step S1304, the master management unit 413 sets the update version that is incremented from the current update version (owner) 1403 acquired in step S1302 as an update version (owner) 1404 of the updated print document information 505.

In step S1305, the master management unit 413 stores the update version (owner) 1404 set in step S1303 as the current update version (owner) 1403. For example, if the current update version (owner) 1403 before the update request 1203 has been processed is "3", the master management unit 413 sets the update version (owner) 1404 of the updated print document information 505 to "4". Then, the master management unit 413 also updates the current update version (owner) 1403 to "4".

In step S1306, the master management unit 413 checks the owner ID 503 of the updated print document information 505. In step S1307, the master management unit 413 transmits the update request 1201 to the primary cache management server 105 that manages the primary cache (owner) 411 relating to the owner ID 503.

In step S1308, the master management unit 413 checks the group ID 504 of the updated print document information 505. In step S1309, the master management unit 413 transmits the update request 1201 to the primary cache management server 105 that manages the primary cache (group) 410 relating to the group ID 504.

In step S1310, the master management unit 413 determines whether to have transmitted the update request 1201 to all the primary cache management servers 105 that manage the primary cache (group) 410 relating to the group ID 504 included in the updated print document information 505. When the master management unit 413 determines not to have transmitted the update request 1201 thereto (NO in step S1310), the processing returns to step S1308. On the other hand, when the master management unit 413 determines to have transmitted the update request 1201 thereto (YES in step S1310), the master management unit 413 ends the processing.

Figure 15:
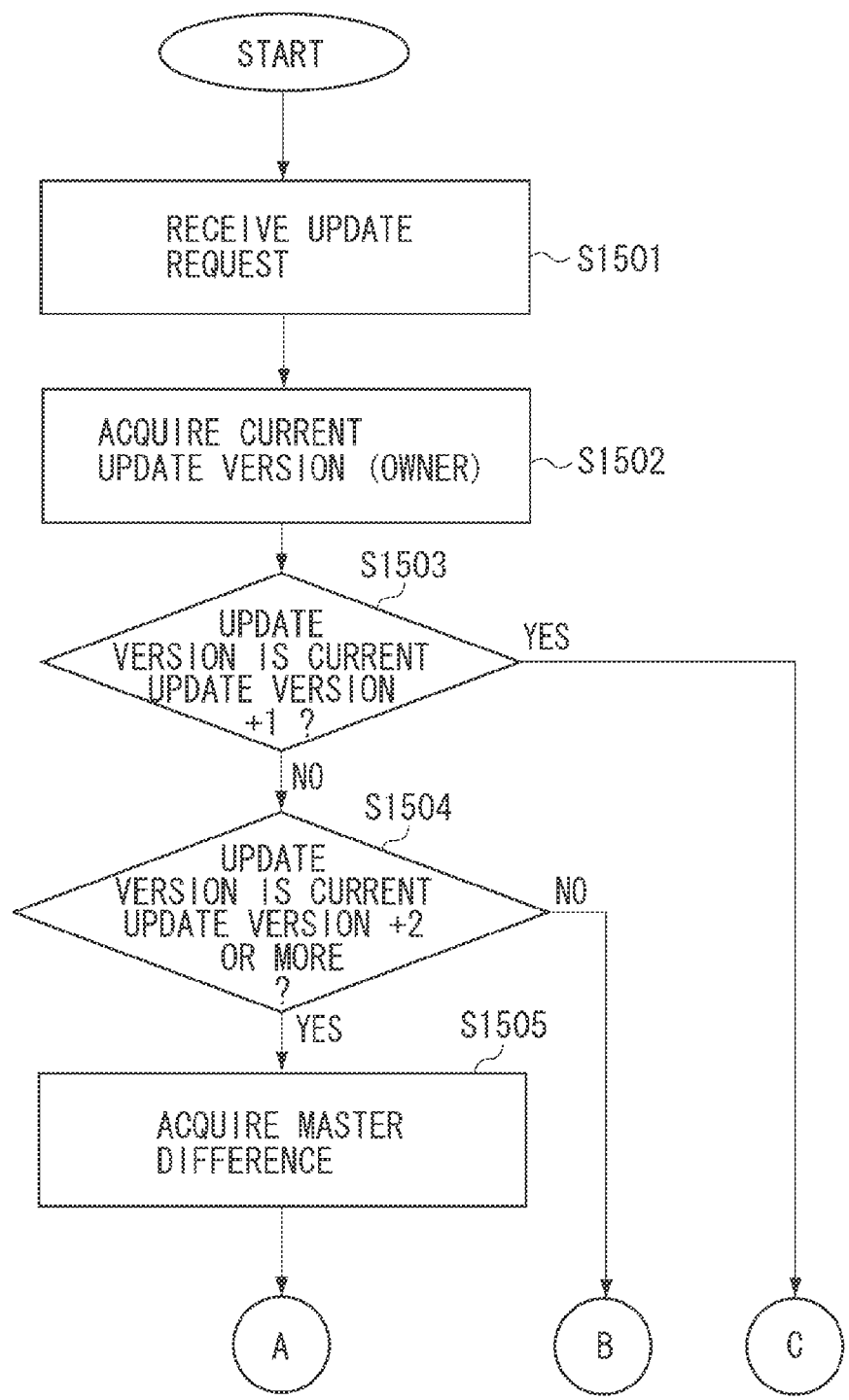
FIG. 15 is a flowchart illustrating processing performed by the primary cache management server.
Figure 16:
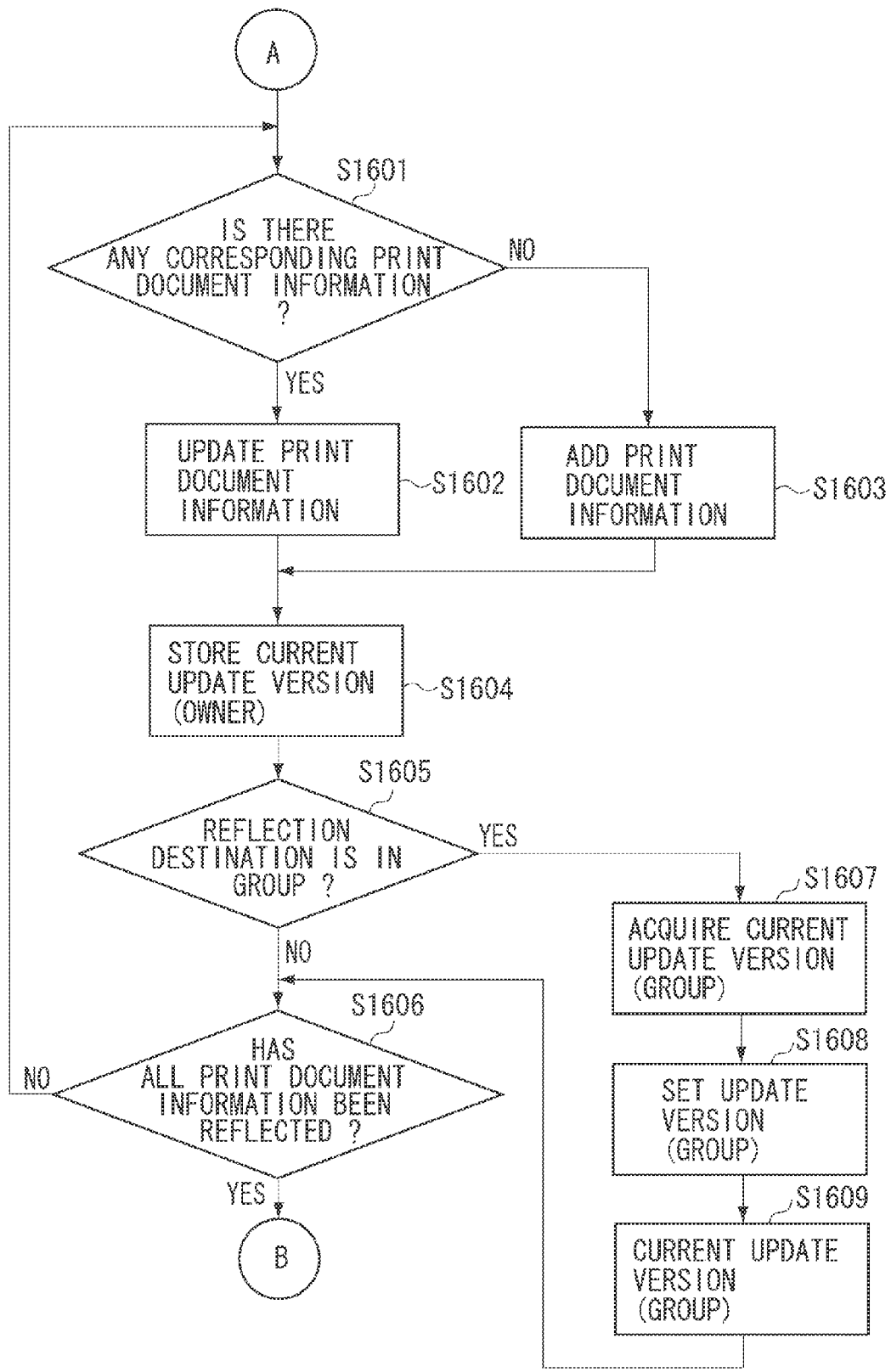
FIG. 16 is a flowchart illustrating processing performed by the primary cache management server.
Figure 17:
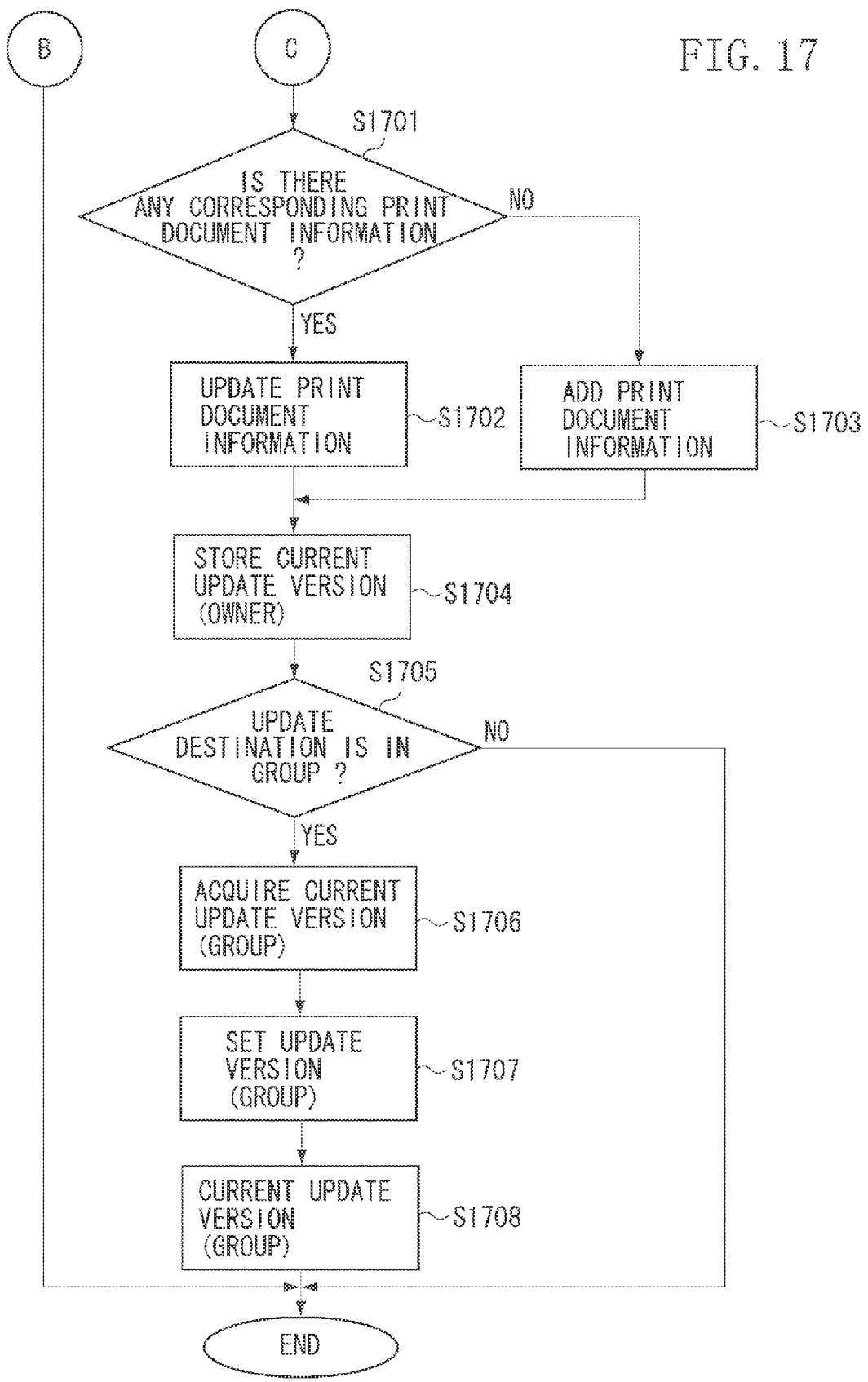
FIG. 17 is a flowchart illustrating processing performed by the primary cache management server.

FIGS. 15, 16, and 17 are flowcharts illustrating the processing performed by the primary cache management server 105 that has received the update request 1201 in the example of the processing illustrated in FIG. 12. The program according to this flowchart, which is stored in the hard disk unit 28, is read into the RAM 22 by the CPU 21 and then executed (example of a primary storage computer).

First, in step S1501, the request processing unit 407 of the primary cache management server 105 receives the update request 1201. Next, in step S1502, the primary cache management unit 408 acquires the current update version (owner) 1403 (refer to FIGS. 14 and 18) of the primary cache (owner) 411 or the primary cache (group) 410 that is the update destination. When the update destination is the primary cache (group) 410, the primary cache management unit 408 acquires the current update versions (owner) 1403 having the same owner ID 1401 from a current update version list (owner) 1805.

Figure 18:
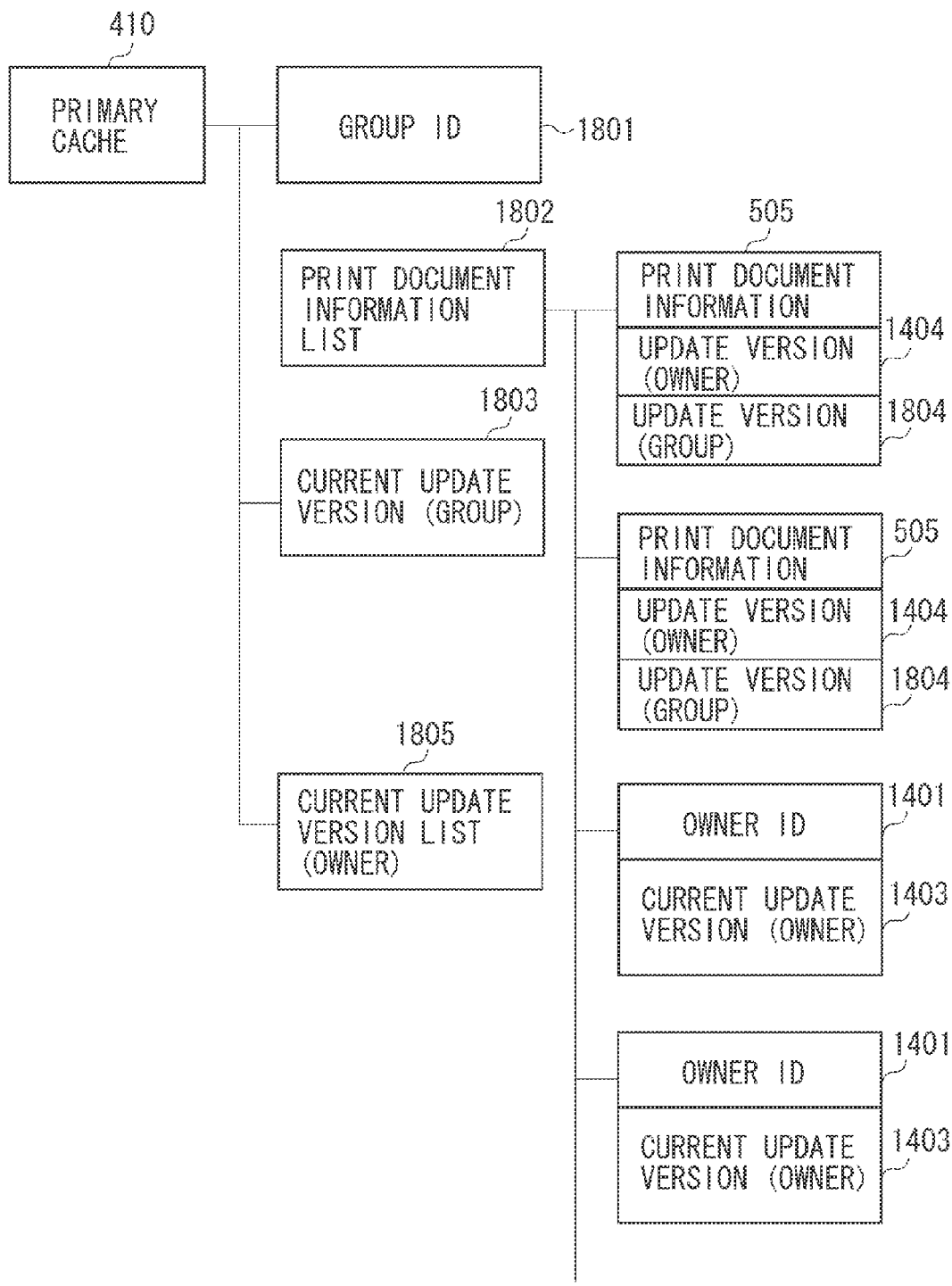
FIG. 18 illustrates a data structure of the primary cache.

FIG. 18 illustrates an example of a data structure of the primary cache (group) 410 managed by the primary cache management server 105. The primary cache (group) 410 includes a group ID 1801 and a print document information list 1802.

A data structure of the primary cache (owner) 411 is the same data structure as that of the master print document information 414 illustrated in FIG. 14. Thus, the same number of the primary caches (owner) 411 as that of the owners are present, and are separately managed by a plurality of primary cache management servers 105.

Further, the same number of the primary caches (group) 410 as that of the groups to which the owner belong is present. As with the primary cache (owner) 411, the primary caches (group) 410 are separately managed by a plurality of primary cache management servers 105.

In step S1503, the primary cache management unit 408 determines whether the update version (owner) 1404 included in the update request 1201 is the next version (+1) of the acquired current update version (owner) 1403. When the primary cache management unit 408 determines that the update version (owner) 1404 is the next version (+1) of the acquired current update version (owner) 1403 (YES in step S1503), the processing proceeds to step S1701.

On the other hand, when the primary cache management unit 408 determines that the update version (owner) 1404 is not the next version (+1) of the acquired current update version (owner) 1403 (NO in step S1503), the processing proceeds to step S1504. In step S1504, the primary cache management unit 408 determines whether the update version (owner) 1404 included in the update request 1201 is two or more updated versions (+2 or more) than the acquired current update version (owner) 1403.

When the primary cache management unit 408 determines that the update version (owner) 1404 is less than two more updated versions (less than +2) than the acquired current update version (owner) 1403 (No in step S1504), since the primary cache management unit 408 has already reflected the print document information 505 included in the update request 1201 to the primary cache (owner) 411 or the primary cache (group) 410, the processing ends. On the other hand, when the primary cache management unit 408 determines that the update version (owner) 1404 is two or more updated versions (+2 or more) than the acquired current update version (owner) 1403 (YES in step S1504), the primary cache management unit 408 detects that the update request 1201 that has not been able to be received due to a communication trouble is present.

Thus, the master acquisition unit 409 transmits to the master management server 106 the difference acquisition request 1202 (example of communication information) including the owner ID 1401 and the current update version (owner) 1403 acquired in step S1502. In step S1505, the master acquisition unit 409 acquires the print document information 505 that is not reflected to the primary cache (owner) 411 or the primary cache (group) 410 from the master management server 106.

In step S1601, the primary cache management unit 408 determines whether the print document information 505 corresponding to the print document ID of the acquired print document information 505 is present in the primary cache (owner) 411 or the primary cache (group) 410.

When the primary cache management unit 408 determines that the print document information 505 corresponding thereto is present therein (YES in step S1601), in step S1602, the primary cache management unit 408 reflects the acquired print document information 505 to the primary cache (owner) 411 or the primary cache (group) 410. On the other hand, when the primary cache management unit 408 determines that the print document information 505 corresponding thereto is not present therein (NO in step S1601), in step S1603, the primary cache management unit 408 adds the acquired print document information 505 to the primary cache (owner) 411 or the primary cache (group) 410. Then, the processing proceeds to step S1604.

In step S1604, the primary cache management unit 408 stores in the current update version (owner) 1403 the update version (owner) 1404 of the print document information 505 that has been reflected to the primary cache (owner) 411 and the primary cache (group) 410. If a reflection destination is the primary cache (group) 410, the primary cache management unit 408 stores the update version (owner) 1404 of the print document information 505 in the current update version (owner) 1403 having the corresponding owner ID 1401 of the current update version list (owner) 1805.

In step S1605, the primary cache management unit 408 determines whether the reflection destination is the primary cache (group) 410. When the primary cache management unit 408 determines that the reflection destination is not the primary cache (group) 410 (NO in step S1605), the processing proceeds to step S1606.

On the other hand, when the primary cache management unit 408 determines that the reflection destination is the primary cache (group) 410 (YES in the step S1605), in step S1607, the primary cache management unit 408 acquires a current update version (group) 1803 of the primary cache (group) 410 of the reflection destination.

In step S1608, the primary cache management unit 408 sets the update version that is incremented from the current update version (group) 1803 acquired in step S1607 as an update version (group) 1804 of the updated print document.

In step S1609, the primary cache management unit 408 stores the update version (group) 1804 set in step S1608 as the current update version (group) 1803. For example, if the current update version (group) 1803 is "3" before the update request 1201 has been processed, the primary cache management unit 408 sets the update version (group) 1804 of the updated print document information 505 to "4". Then, the primary cache management unit 408 also updates the current update version (group) 1803 to "4".

In step S1606, the primary cache management unit 408 determines whether all the print document information 505 of the difference acquired in step S1505 is reflected on the primary cache (owner) 411 or the primary cache (group) 410. When the primary cache management unit 408 determines that all the print document information 505 thereof is reflected thereon (YES in step S1606), the primary cache management unit 408 ends the processing. On the other hand, when the primary cache management unit 408 determines that all the print document information thereof is not reflected thereon (NO in step S1606), the processing returns to step S1601.

In step S1503, when it is determined that update version is the next version (YES in step S1503), the processing proceeds to step S1701. In step S1701, the primary cache management unit 408 determines whether the print document information 505 corresponding to the print document ID of the print document information 505 included in the update request 1201 is present in the primary cache (owner) 411 or the primary cache (group) 410.

When it is determined that the print document information 505 corresponding thereto is present therein (YES in step S1701), the processing proceeds to step S1702. In step S1702, the primary cache management unit 408 reflects the acquired print document information 505 on the primary cache (owner) 411 or the primary cache (group) 410. On the other hand, it is determined that the print document information 505 corresponding thereto is not present therein (NO in step S1701), in step S1703, the primary cache management unit 408 adds the acquired print document information 505 to the primary cache (owner) 411 or the primary cache (group) 410, and then, the processing proceeds to step S1704.

In step S1704, the primary cache management unit 408 stores in the current update version (owner) 1403 the update version (owner) 1404 of the print document information 505 that is reflected on the primary cache (owner) 411 or the primary cache (group) 410. When the reflection destination is the primary cache (group) 410, the primary cache management unit 408 stores the update version (owner) 1404 in the current update version (owner) 1403 having the owner ID 1401 that corresponds to that of the current update version list (owner) 1805.

In step S1705, the primary cache management unit 408 determines whether the reflection destination is the primary cache (group) 410. When the primary cache management unit 408 determines that the reflection destination is not the primary cache (group) 410 (NO in step S1705), the primary cache management unit 408 ends the processing. On the other hand, when the primary cache management unit 408 determines that the reflection destination is the primary cache (group) 410 (YES in step S1705), in step S1706, the primary cache management unit 408 acquires the current update version (group) 1803 of the primary cache (group) 410, which is the reflection destination.

In step S1707, the primary cache management unit 408 sets the update version that is incremented from the current update version (group) 1803 acquired in step S1706 as an update version (group) 1804 of the print document. In step S1708, the primary cache management unit 408 stores the update version (group) 1804 set in step S1707 as the current update version (group) 1803, and then ends the processing.

Figure 19:
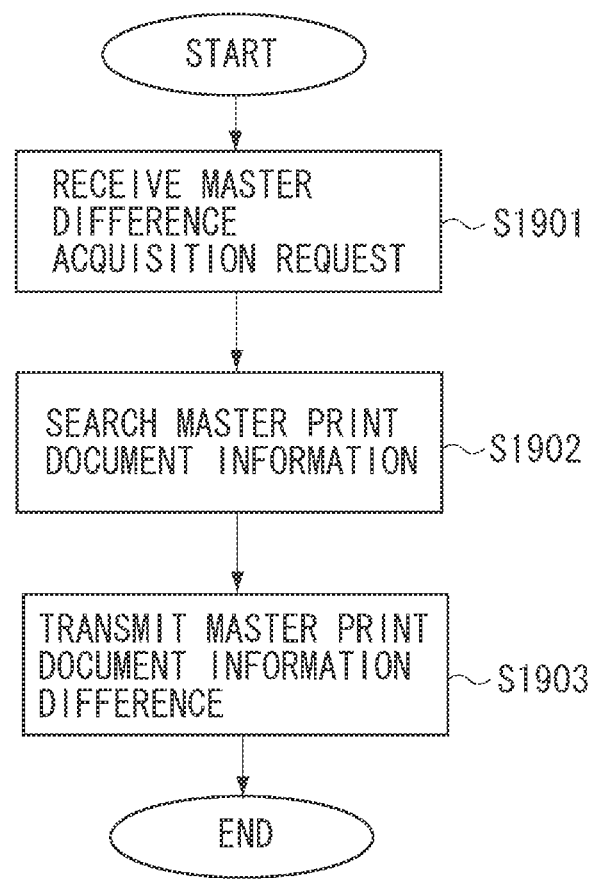
FIG. 19 is a flowchart illustrating processing performed by the master management server.

FIG. 19 is a flowchart illustrating processing performed by the master management server 106 that has received the difference acquisition request 1202 transmitted from the primary cache management server 105 in step S1505 illustrated in FIG. 15. The program according to this flowchart, which is stored in the hard disk unit 28 of the master management server 106, is read by the CPU 21 into the RAM 22 to be executed.

In step S1901, the request processing unit 412 of the master management server 106 receives the difference acquisition request 1202.

In step S1902, the master management unit 413 searches for the print document information 505 having a newer update version (owner) 1404 than the current update version (owner) 1403 included in the difference acquisition request 1202. For example, if the current update version (owner) 1403 included in the difference acquisition request 1202 is "5", the master management unit 413 searches for the print document information 505 of the update version (owner) 1404 having "6" or more.

In step S1903, the request processing unit 412 transmits the print document information 505 that has been searched for in step S1902 to the primary cache management server 105 as the difference, and ends the processing.

Figure 20:
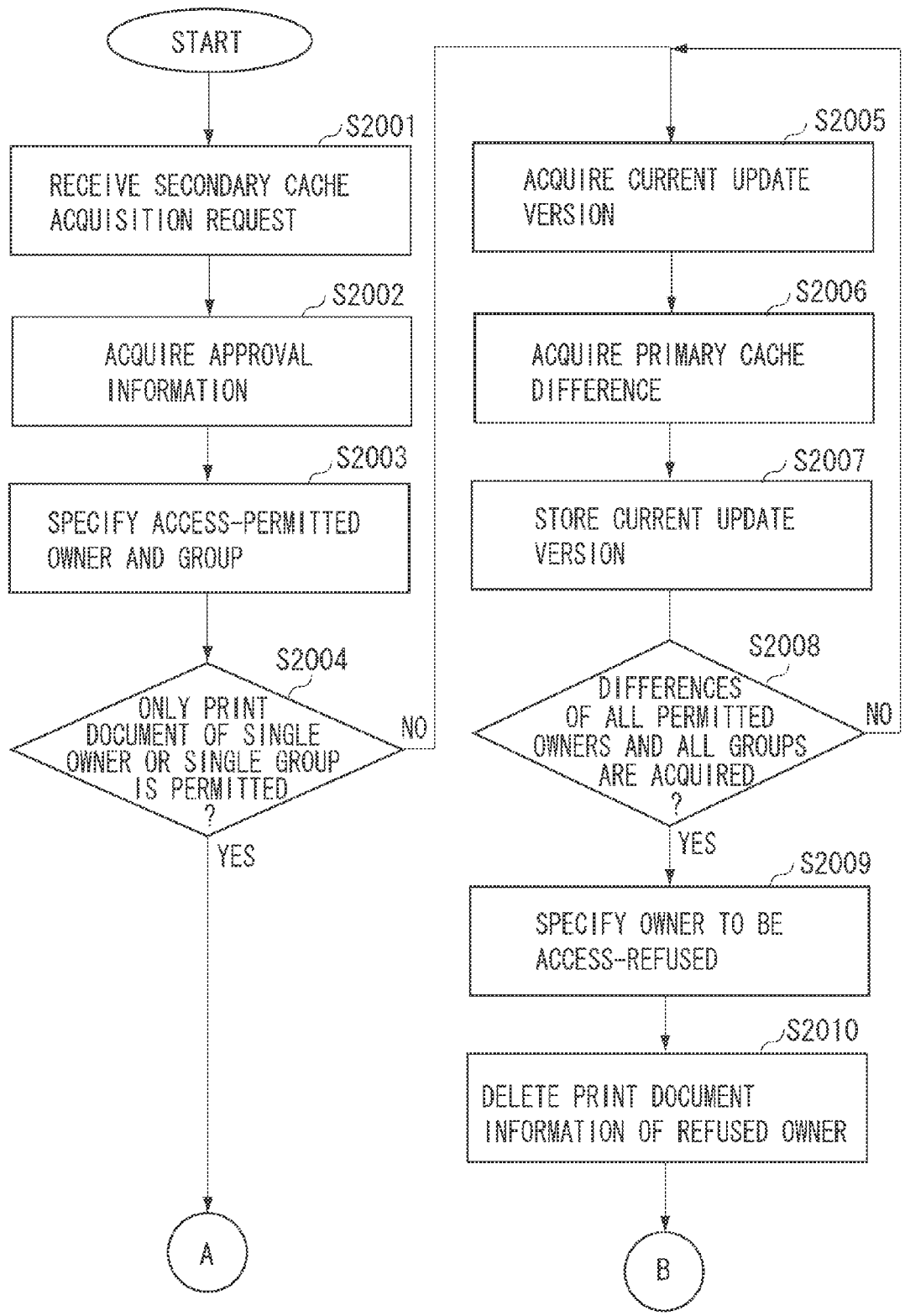
FIG. 20 is a flowchart illustrating processing performed by the secondary cache management server.
Figure 21:
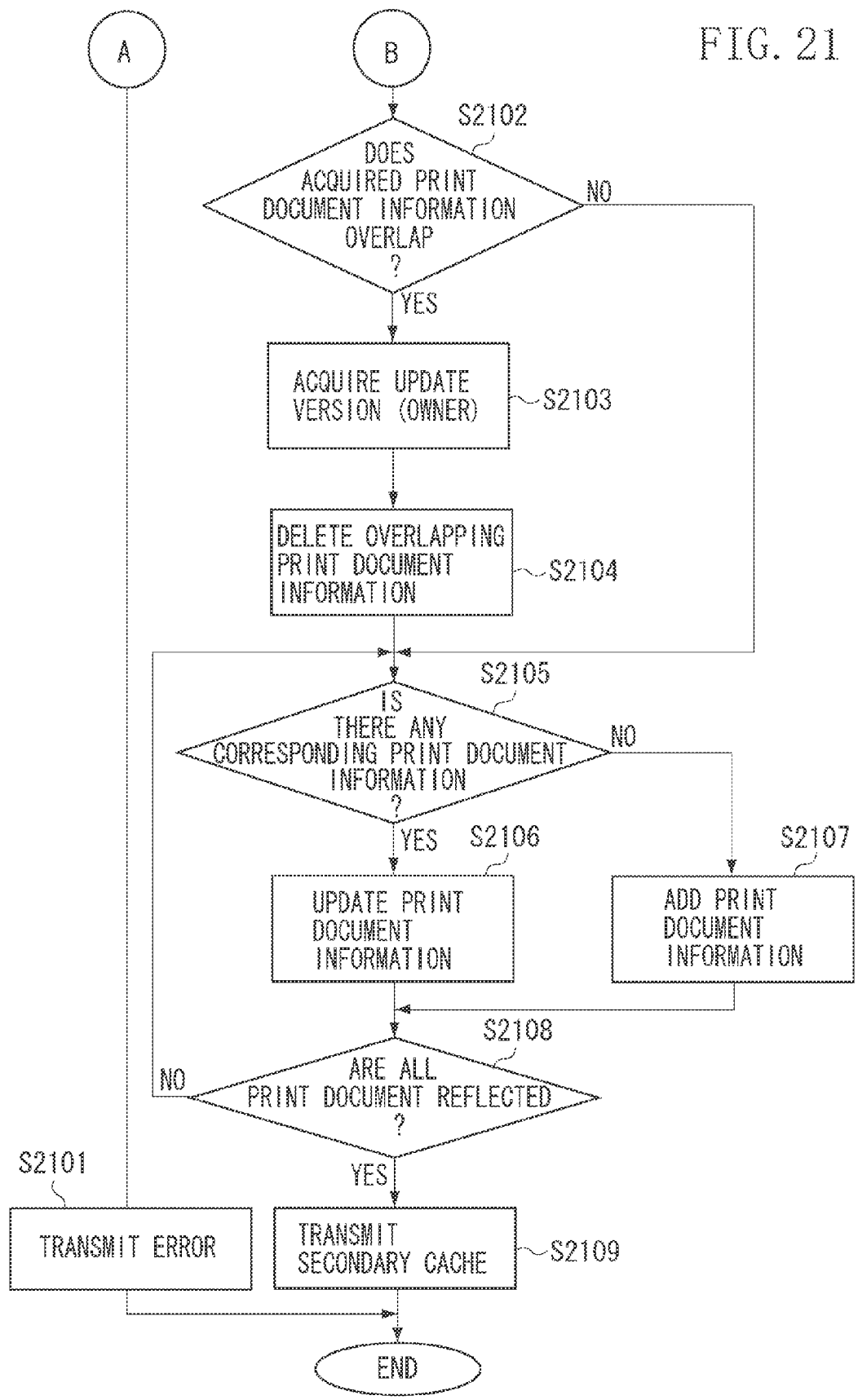
FIG. 21 is a flowchart illustrating processing performed by the secondary cache management server.

FIGS. 20 and 21 are flowcharts illustrating processing performed by the secondary cache management server 104 that has received the secondary cache acquisition request 903 from the Web access server 102 in FIG. 9. The program according to this flowchart, which is stored in the hard disk unit 28 of the secondary cache management server 104, is read by the CPU 21 (example of the secondary storage computer) into the RAM 22 to be executed.

In step S2001, the request processing unit 401 of the secondary cache management server 104 receives the secondary cache acquisition request 903 from the Web access server 102. The secondary cache acquisition request 903 includes the authentication information 305.

In step S2002, the approval unit 402 acquires the approval information 405. In step S2003, the approval unit 402 specifies the owner ID 503 to which the login user is permitted to refer and the group ID 504 to which the owner of the owner ID 503 belongs from the received authentication information 305 and approval information 405. In step S2004, the approval unit 402 determines whether the print document data to which the login user is permitted to refer, as a result of the specification in step S2002, is the print document data of the single owner or the single group.

When the approval unit 402 determines that the print document data is the print document data of the single owner or the single group (YES in step S2004), in step S2101, the request processing unit 401 transmits an error (example of response information) to the Web access server 102. In step S1106 illustrated in FIG. 11, the Web access server 102 that has received the error transmits the primary cache acquisition request 905 to the primary cache management server 105.

On the other hand, when the approval unit 402 determines that the print document data is not the print document data of the single owner or the single group (NO in step S2004), the processing proceeds to step S2005.

In step S2005, the secondary cache management unit 404 acquires from the current update version list (owner) 2203 the current update version (owner) 1403 having the owner ID 1401 that corresponds to the specified owner ID 503. Alternatively, the secondary cache management unit 404 acquires from the current update version list (group) 2204 the current update version (group) 1803 whose group ID 1801 corresponds to the group ID 504.

Figure 22:
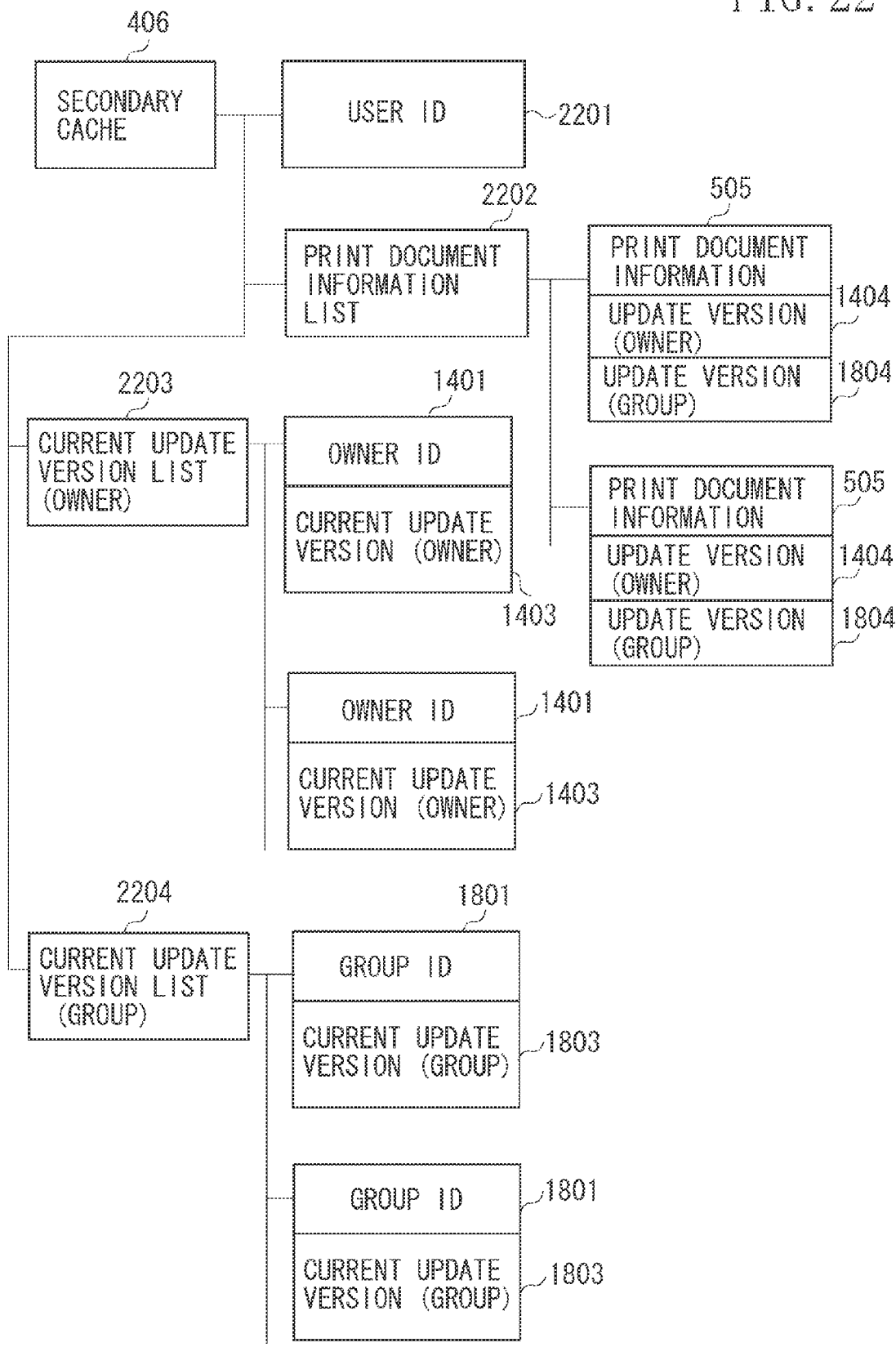
FIG. 22 illustrates a data structure of secondary cache.

FIG. 22 illustrates an example of a data structure of the secondary cache 406 managed by the secondary cache management server 104. The secondary cache 406 includes a user ID 2201, a print document information list 2202, a current update version list (owner) 2203, and a current update version list (group) 2204. The same number of the secondary caches 406 as that of the users who logs in the print document managing system are present, and are separately managed by a plurality of secondary cache management servers 104.

In step S2006, the primary cache acquisition unit 403 transmits the primary cache difference acquisition request 904 to the primary cache management server 105 that manages the primary cache (owner) 411 relating to the owner ID 503 specified in step S2002.

Alternatively, the primary cache acquisition unit 403 transmits the primary cache difference acquisition request 904 to the primary cache management server 105 that manages the primary cache (group) 410 relating to the group ID 504 specified in step S2002. The primary cache difference acquisition request 904 includes the current update version acquired in step S2005.

In step S2007, the secondary cache management unit 404 stores the newest update version from among the primary cache (owner) 411 acquired in step S2006 as the current update version (owner) 1403.

For example, if the update version of the primary cache (owner) 411 of the acquired difference is "6", "7", or "8", the secondary cache management unit 404 updates the current update version (owner) 1403 to "8". Alternatively, the secondary cache management unit 404 stores the newest update version among the primary cache (group) 410 of the acquired difference as the current update version (group) 1803.

In step S2008, the secondary cache management unit 404 determines whether the primary caches (owner) 411 of the differences of all the owner IDs 504 and the primary caches (group) 410 of the differences of all the owner IDs 504 specified in step S2002 are acquired. When the secondary cache management unit 404 determines that the primary caches (owner) 411 thereof and the primary caches (group) 410 thereof are not acquired (NO in step S2008), the processing returns to step S2005.

On the other hand, when the secondary cache management unit 404 determines that the primary caches (owner) 411 thereof and the primary caches (group) 410 thereof are acquired (YES in step S2008), the processing proceeds to step S2009. In step S2009, the approval unit 402 specifies the owner ID 503 with which the login user is refused from the authentication information 305 of the login user included in the secondary cache acquisition request 903 and the approval information 405 acquired in step S2002. The approval information 405 is an example of the control information.

In S2010, the secondary cache management unit 404 deletes the print document information 505 having the owner ID 503 specified in step S2009 from the primary cache (owner) 411 and the primary cache (group) 410 of the difference acquired in step S2006.

In step S2102, the secondary cache management unit 404 determines whether there is any print document information 505 having overlapping print document IDs in the primary cache (owner) 411 and the primary cache (group) 410 of the acquired difference. When the secondary cache management unit 404 determines that there is no print document information 505 having the overlapping print document IDs therein (NO in step S2102), the processing proceeds to step S2105.

On the other hand, when the secondary cache management unit 404 determines that there is the print document information 505 having the overlapping print document IDs therein (YES in step S2102), in step S2103, the secondary cache management unit 404 acquires the update versions (owner) 1404 of the print document information 505 having the overlapping print document IDs.

In step S2104, the secondary cache management unit 404 compares the acquired update versions (owner) 1404, and then deletes all the print document information 505 except for the newest print document information 505. For example, if the update versions (owner) 1404 of the overlapping print document information 505 are "6", "7", and "8", the secondary cache management unit 404 deletes the print document information 505 of the update versions (owner) 1404 "6" and "7".

In step S2105, the secondary cache management unit 404 determines whether there is any print document information 505 in the secondary cache 406 having the print document ID corresponding to that of the print document information 505 in the primary cache (owner) 411 or the primary cache (group) 410 of the difference. When the secondary cache management unit 404 determines that there is the print document information 505 having the print document ID corresponding thereto (YES in step S2105), in step S2106, the secondary cache management unit 404 reflects the print document information 505 on the secondary cache 406. On the other hand, when the secondary cache management unit 404 determines that there is no print document information 505 having the print document ID corresponding thereto (NO in step S2105), in step S2107, the secondary cache management unit 404 adds the print document information 505 to the secondary cache 406.

In step S2108, the secondary cache management unit 404 determines whether all the primary caches (owner) 411 and the primary caches (group) 410 of the acquired differences are reflected on all the secondary caches 406. When the secondary cache management unit 404 determines that all the primary caches (owner) 411 and the primary caches (group) 410 thereof are not reflected thereon (NO in step S2108), the processing proceeds to step S2105. On the other hand, when the secondary cache management unit 404 determines that all the primary caches (owner) 411 and the primary caches (group) 410 thereof are reflected thereon (YES in step S2108), in step S2109, the request processing unit 401 transmits the secondary cache 406 to the Web access server 102.

Figure 23:
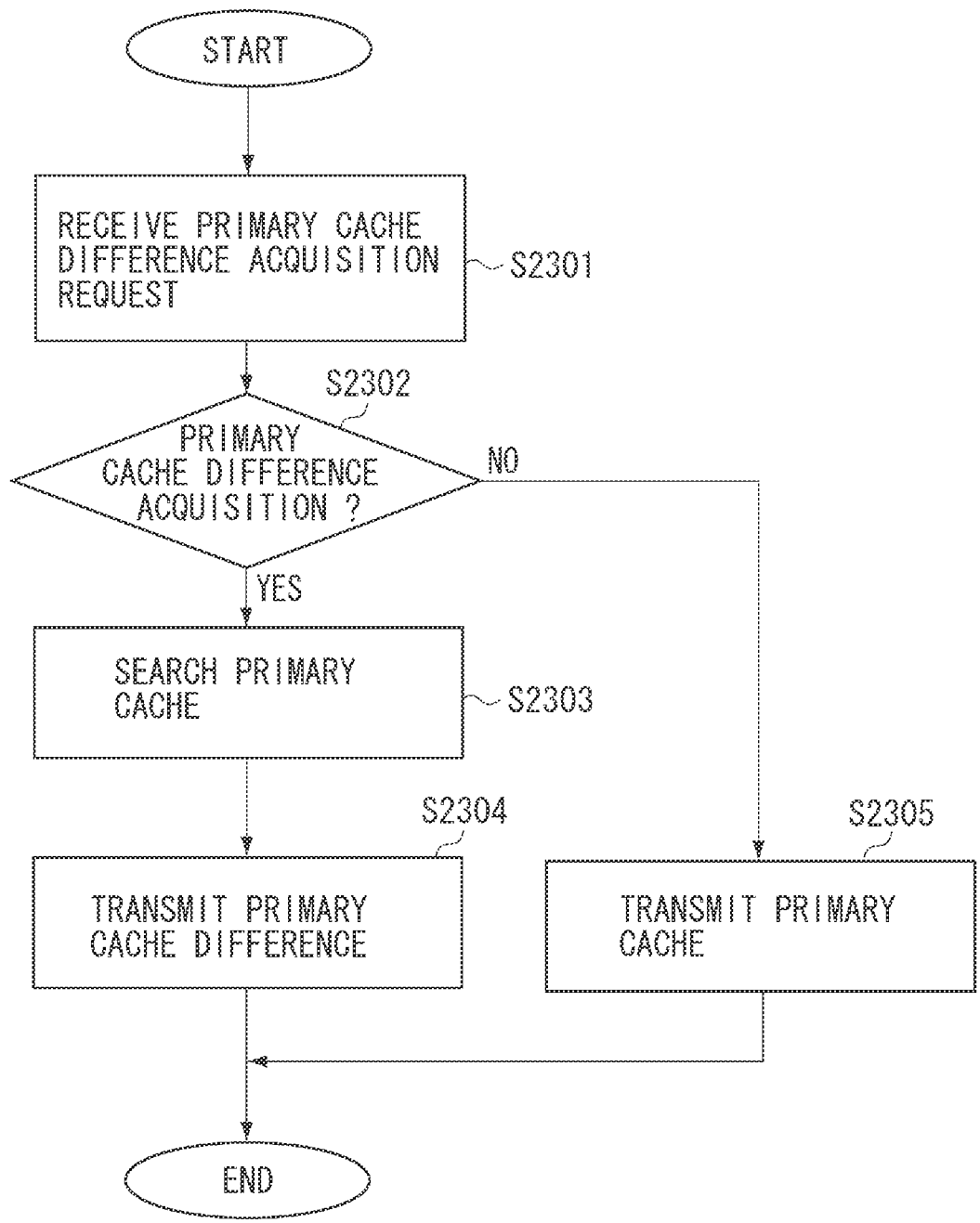
FIG. 23 is a flowchart illustrating processing performed by the primary cache management server.

FIG. 23 is a flowchart illustrating processing performed by the primary cache management server 105 that has received the primary cache acquisition request 905 or the primary cache difference acquisition request 904 from the Web access server 102 in FIG. 9. The program according to this flowchart, which is stored in the hard disk unit 28 of the primary cache management server 105, is read by the CPU 21 into the RAM 22 to be executed.

In step S2301, the request processing unit 407 of the primary cache management server 105 receives the primary cache acquisition request 905 or the primary cache difference acquisition request 904. In step S2302, the request processing unit 407 determines whether to have received the primary cache difference acquisition request 904. When the request processing unit 407 determines not to have received the primary cache difference acquisition request 904 (NO in step S2302), in step S2305, the request processing unit 407 transmits the primary cache (owner) 411 or the primary cache (group) 410 to the Web access server 102, and ends the processing.

On the other hand, when the request processing unit 407 determines to have received the primary cache difference acquisition request 904 (YES in step S2302), the processing proceeds to step S2303. In step S2303, the primary cache management unit 408 searches for the print document information 505 having the newer update version (owner) 1404 than the current update version (owner) 1403 included in the primary cache difference acquisition request 904.

Alternatively, the primary cache management unit 408 searches for the print document information 505 having the newer update version (group) 1804 than the current update version (group) 1803 included in the primary cache difference acquisition request 904.

For example, when the current update version (group) 1803 included in the primary cache difference acquisition request 904 is "5", the primary cache management unit 408 searches for the print document information 505 having the update version (group) 1804 of "6" or more.

In step S2304, the request processing unit 407 transmits the print document information 505 found in step S2303 to the secondary cache management server 104 as the difference. Then, the processing ends.

As described above, the user belongs to a plurality of groups and a permission for referring to the print document data is given to the group to which the owner belongs, so that the print document managing system, in which the print document data can be shared among users, can be realized. According to the present exemplary embodiment, the information (print document information) about the print document data is separately managed by a plurality of apparatuses (machines) so that the user can efficiently collect the print document information to which the user can refer from a plurality of machines.

Further, according to the present exemplary embodiment, a setting can be implemented so that the group is permitted to refer to the print document data and the owner of the print document information is refused to refer to the print document information. With this structure, even when the print document data can be controlled to be shared among the users, the users can efficiently collect the print document information which the users can refer to from a plurality of machines.

Further, when the group to which the owner of the print document data, to which the user is permitted to refer, belongs is the single group, the print document information to which the user can refer can be efficiently collected from a plurality of machines.

Furthermore, the owner of the print document data and the group to which the owner belongs to are permitted to refer to the print document information, so that, even when the print document data can be controlled to be shared among the users, the print document information can be efficiently collected from a plurality of machines.

Moreover, when the owner of the print document to which the user is permitted to refer or the group to which the owner belongs is the single owner or the single group respectively, the user can efficiently collects the print document information to which the user can refer from a plurality of machines.

Further, the group to which the owner of the print document data belongs is permitted to refer to the print document information, so that the print document managing system, in which the print document data can be shared among the users, can be realized. In this case, by adding the update version to the print document information, the print document information to which the user can refer can be efficiently collected from a plurality of machines.

Furthermore, the owner of the print document data and the group to which the owner belongs are permitted to refer to the print document information, so that the print document managing system in which the print document data can be shared among the users can be realized. In this case, by adding the update version to the print document information, the print document information to which the user can refer can be efficiently collected from a plurality of machines.

Moreover, by adding the update version to the print document information, even when a communication trouble temporarily occurs, the user can collect the entire print document information to which the user can refer from a plurality of machines.

As described above, according to the present exemplary embodiment, in the print document managing system that adopts different print document data to which each user can refer, the print document information can be separately managed by a plurality of machines, and the print document information to which the user can refer can be efficiently collected from a plurality of machines.

Further, the user belongs to a plurality of groups and the group to which the owner of the print document data belongs is permitted to refer to the print document data, so that the print document managing system in which the print document data can be shared among the users can be realized. More specifically, the print document information is separately managed by a plurality of machines, so that the print document data to which the user can refer is efficiently collected from a plurality of machines.

With this arrangement, the number of machines that separately manages the information about the print document data is increased not to decrease performance of the machine even when the amount of the print document data to be managed by the print document managing system and the number of users referring to the print document data are increased.

The exemplary embodiments of the present invention have been described in detail. However, it will be appreciated that those skilled in the art, upon consideration of the present disclosure, may make modifications and/or improvements on this invention and still be within the scope and spirit of this invention as set forth in the following claims.

Aspects of the present invention can also be realized by a computer of a system or apparatus (or devices such as a CPU or MPU) that reads out and executes a program recorded on a memory device to perform the functions of the above-described embodiments, and by a method, the steps of which are performed by a computer of a system or apparatus by, for example, reading out and executing a program recorded on a memory device to perform the functions of the above-described embodiments. For this purpose, the program is provided to the computer for example via a network or from a recording medium of various types serving as the memory device (e.g., computer-readable medium). In such a case, the system or apparatus, and the recording medium where the program is stored, are included as being within the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-279720 filed Dec. 9, 2009, which is hereby incorporated by reference herein in its entirety.

What is claimed is:

1. A document management system, in which a user is permitted to refer to a document whose owner having registered the document is a member of a group to which the user belongs, including a primary storage server a secondary storage server and a master server, the document management system comprising:
    a storage unit that is included in the primary storage server and configured to store document information about the document including owner information for identifying the user who has registered the document and group information for identifying a group to which the user belongs in a primary storage server storage device for each group based on the group information included in the document information;
    a specification unit that is included in the secondary storage server and configured to specify the group information for identifying the group to which the user who accesses the document belongs;
    an acquisition unit that is included in the secondary storage server and configured to acquire the document information about the group information specified by the specification unit from the primary storage server storage device;
    a storage unit that is included in the secondary storage server and configured to store the document information acquired by the acquisition unit in a secondary storage server storage device for each user based on information about the user who accesses the document;
    a storage unit included in the master server and configured to store the document information about the document registered by each of a plurality of users in a master server storage unit for each owner based on owner information included in the document information;
    a communication unit included in the master server and configured to transmit the document information stored in the storage unit to the primary storage server; and
    a communication unit included in the primary storage server and configured to receive the document information from the master server,
    wherein the storage unit of the primary storage server stores the document information in the primary storage server storage device for each group based on the group information included in the document information received by the communication unit.

2. The document management system according to claim 1, including each at least one of the primary storage server, the secondary storage server, and the master server,
    wherein the storage unit of the primary storage server stores the document information about the document including the owner information for identifying the user who has registered the document and the group information for identifying the group to which the user belongs in the primary storage server storage device for each group based on the group information included in the document information, so that the document information is capable of being separated for each group to another storage device different from the primary storage server storage device,
    wherein the acquisition unit of the secondary storage server acquires the document information about the group information specified by the specification unit of the secondary storage server from the primary storage server storage device that stores the document information,
    wherein the storage unit of the secondary storage server stores the document information acquired by the acquisition unit for each user in the secondary storage server storage device, so that the document information is capable of being separated for each user to another storage device different from the secondary storage server storage device,
    wherein the storage unit of the master server stores the document information about the document registered by each of a plurality of users in the master server storage device for each owner based on owner information included in the document information, so that the document information is capable of being separated for each owner to another storage device different from the master server storage device,
    wherein the communication unit of the master server transmits the document information stored by the storage unit of the master server to the primary storage server including the primary storage server storage device that stores the document information specified based on the group information included in the document information.

3. The document management system according to claim 1,
    wherein the specification unit of the secondary storage server specifies the owner information for identifying the user who has been refused to access the document based on control information for controlling a user's access to the document, and
    wherein the storage unit of the secondary storage server stores for each user the document information in which the document information including the owner information specified by the specification unit is excluded from the document information acquired by the acquisition unit of the secondary storage server in the secondary storage server storage device.

4. The document management system according to claim 1, further comprising:
    an information providing server wherein the information providing server includes:
        a reception unit configured to receive the user information input by the user;

a communication unit configured to transmit the user information received from the reception unit to the secondary storage server; and wherein the secondary storage server includes:
a communication unit configured to, if it is determined that the group to which the user related to the user information is single when receiving the user information transmitted by the communication unit of the information providing server, transmit response information that the group is single to the information providing server, and if it is determined that the group is not single, the document information about the user is acquired from the secondary storage server storage device and then transmits the document information to the information providing server, wherein the communication unit of the information providing server, when receiving the response information transmitted by the communication unit of the secondary storage server, transmits to the primary storage server the group information about the group to which the user belongs related to the user information received by the reception unit; and wherein the communication unit of the primary storage server, when receiving the group information transmitted by the communication unit of the information providing server, acquires the document information including the group information from the primary storage server storage device and then transmits the document information to the information providing server.

5. The document management system according to claim 1, wherein the master server further comprising:
a setting unit configured to, when detecting a change of the document information, reflect the change on the document information and also set version information representing a version of the document information for the document information; and wherein the communication unit of the master server transmits the document information on which the change is reflected by the setting unit and also the version information set for the document information by the setting unit;

wherein the primary storage server further includes:
a setting unit configured to reflect the document information transmitted by the communication unit of the master server on the primary storage server storage device and also set the version information transmitted by the communication unit of the master server for the document information, wherein the acquisition unit of the secondary storage server acquires from the primary storage server storage device the document information about the group information specified by the specification unit of the secondary storage server and the version information set for the document information; and wherein the storage unit of the secondary storage server compares the version information acquired by the acquisition unit and then reflects newest document information of the document information acquired by the acquisition unit on the secondary storage server storage device.

6. The document management system according to claim 5, wherein the primary storage server further includes:
a detection unit configured to detect that, based on the version information transmitted from the communication unit of the master server, the document information transmitted from the communication unit thereof has not been received; and wherein the communication unit of the primary storage server, when it is detected that the communication information has not been received, transmits to the master server communication information including the current version information and informing that the communication information has not been detected; and wherein the master server further includes:
a search unit and configured to search the master server for the document information about newer version information than current version information included in communication information received from the communication unit of the master server, wherein the communication unit of the master server transmits the document information searched by the search unit to the primary storage server.

7. The document management system further according to claim 1, further comprising an information providing server,
wherein the information providing server includes;
a reception unit configured to receive an input of user information by a user; and a communication unit configured to transmit the user information received by the reception unit to the secondary storage server;

wherein the storage unit of the primary storage server stores the document information in the primary storage server storage device for each owner based on the owner information included in the document information;

wherein the secondary storage server further includes;
a communication unit configured to, when receiving the user information transmitted by the communication unit of the information providing server if it is determined that the group to which the user related to the user information belongs is single or if the user related to the user information is single, transmit response information informing that either of the group and the user is single, and if it is determined that neither thereof is single, acquire the document information about the user from the secondary storage server storage device and then transmits the document to the information providing server, wherein the communication unit of the information providing server, when receiving the response information from the communication unit of the second storage server, transmits to the primary storage server the group information about the group to which the user related to the user information received by the reception unit belongs and the owner information indicating that the user related to the user information received by the reception unit is an owner according to the response information the owner information indicating that the user related to the user information received by the reception unit; and wherein the communication unit of the primary storage server, when receiving the group information transmitted from the communication unit of the information providing server, acquire the document information including the group information from the primary storage server storage device and then transmits the document information to the information providing server, and when receiving the owner information transmitted from the communication unit of the information providing server, acquire the document information including the owner information from the primary storage server storage device and then transmit the document information to the information providing server.

8. A document managing method in a document management system, in which a user is permitted to refer to a document whose owner having registered the document is a member of a group to which the user belongs, including a primary storage server, secondary storage server and a master server, the document managing method comprising:

storing, by the primary storage server, document information about the document including owner information for identifying the user who has registered the document and group information for identifying a group to which the user belongs in a primary storage server storage device for each group based on the group information included in the document information; and specifying, by the secondary storage server, the group information for identifying the group to which the user accessing the document belongs;

acquiring, by the secondary storage server, the document information about the group information specified by specifying from the primary storage server storage unit;

storing, by the secondary storage server, the document information acquired by acquiring in a secondary storage server storage device for each user based on information about the user accessing the document;

storing, by the master server, the document information about the document registered by each of a plurality of users in a master server storage unit for each owner based on owner information included in the document information;

transmitting, by the master server, the document information stored in the storage unit to the primary storage server; and receiving, by the primary storage server, the document information from the master server, wherein the storage unit of the primary storage server stores the document information in the primary storage server storage device for each group based on the group information included in the document information received by the communication unit.

9. A non-transitory computer-readable storage medium for storing a computer-executable process for controlling a document management system, in which a document is shared among users, that permits a user to refer to a document whose owner having registered the document is a member of a group to which the user belongs, and the document management system including a primary storage computer, secondary storage computer and a master computer, the method performed by the primary storage computer, the secondary storage computer and the master computer comprising:

storing, by the primary storage computer, document information about the document including owner information for identifying the user who has registered the document and group information for identifying a group to which the user belongs in a primary storage computer storage device for each group based on the group information included in the document information; and specifying, by the secondary storage computer, the group information for identifying the group to which the user accessing the document belongs;

acquiring, by the secondary storage computer, the document information about the group information specified by the specification unit by the primary storage computer storage device;

storing, by the secondary storage computer, the document information acquired by the acquisition unit in a secondary storage computer storage device for each user based on information about the user accessing the document;

storing, by the master computer, the document information about the document registered by each of a plurality of users in a master computer storage unit for each owner based on owner information included in the document information;

transmitting, by the master computer, the document information stored in the storage unit to the primary storage computer; and receiving, by the primary storage computer, the document information from the master computer, wherein the storage unit of the primary storage computer stores the document information in the primary storage computer storage device for each group based on the group information included in the document information received by the communication unit.

10. A system, in which a user is permitted to refer to a document whose owner having registered the document is a member of a group to which the user belongs, including a primary storage server a secondary storage server and a master server, the system comprising:

a transmission unit provided in a client configured to transmit a request for acquisition of the document;

a storage unit that is included in the primary storage server and configured to store document information about the document including owner information for identifying the user who has registered the document and group information for identifying a group to which the user belongs in a primary storage server storage device for each group based on the group information included in the document information;

a specification unit that is included in the secondary storage server and configured to specify the group information for identifying the group to which the user who accesses the document belongs;

an acquisition unit that is included in the secondary storage server and configured to acquire the document information about the group information specified by the specification unit from the primary storage server storage device;

a storage unit that is included in the secondary storage server and configured to store the document information acquired by the acquisition unit in a secondary storage server storage device for each user based on information about the user who accesses the document;

a storage unit included in the master server and configured to store the document information about the document registered by each of a plurality of users in a master server storage unit for each owner based on owner information included in the document information;

a communication unit included in the master server and configured to transmit the document information stored in the storage unit to the primary storage server; and a communication unit included in the primary storage server and configured to receive the document information from the master server, wherein the storage unit of the primary storage server stores the document information in the primary storage server storage device for each group based on the group information included in the document information received by the communication unit.

* * * * *